US006072903A

United States Patent [19]
Maki et al.

[11] Patent Number: 6,072,903
[45] Date of Patent: Jun. 6, 2000

[54] IMAGE PROCESSING APPARATUS AND IMAGE PROCESSING METHOD

[75] Inventors: Atsuto Maki; Mutsumi Watanabe, both of Kobe; Natsuko Matsuda, Tokyo, all of Japan; Charles Wiles, Surrey, United Kingdom

[73] Assignee: Kabushiki Kaisha Toshiba, Kawasaki, Japan

[21] Appl. No.: 09/001,465

[22] Filed: Dec. 31, 1997

[30] Foreign Application Priority Data

| Jan. 7, 1997 | [JP] | Japan | .................................... 9-000767 |
| Mar. 18, 1997 | [JP] | Japan | .................................... 9-065142 |
| Sep. 19, 1997 | [JP] | Japan | .................................... 9-273573 |

[51] Int. Cl.[7] .............................. G06K 9/00; G06K 9/46; H04N 7/18; H04N 5/225
[52] U.S. Cl. .......................... 382/190; 382/103; 382/154; 382/203; 348/77; 348/169
[58] Field of Search ...................................... 382/153, 154, 382/190, 201, 203, 103, 169; 348/48, 50, 77

[56] References Cited

U.S. PATENT DOCUMENTS

| 4,654,872 | 3/1987 | Hisano et al. ........................... 382/154 |
| 4,982,438 | 1/1991 | Usami et al. ........................... 382/154 |
| 5,227,985 | 7/1993 | DeMenthon ............................ 702/153 |
| 5,475,422 | 12/1995 | Mori et al. ................................ 348/48 |
| 5,768,415 | 6/1998 | Jagadish et al. ......................... 382/154 |
| 5,845,006 | 12/1998 | Sumi et al. .............................. 382/154 |
| 5,870,490 | 2/1999 | Takahashi et al. ...................... 382/154 |

Primary Examiner—Leo H. Boudreau
Assistant Examiner—Daniel G. Mariam
Attorney, Agent, or Firm—Oblon, Spivak, McClelland, Maier & Neustadt PC

[57] ABSTRACT

A moving picture processing apparatus comprises an image capture unit for taking in time-series images (moving picture series) of a target object, a feature point extraction unit for extracting feature points constituting the surface of the object whose model is to be made, a three-dimensional position information extraction unit for finding three-dimensional position information on the feature points by correlating the feature points contained in the image at a point in time with those at another point in time in the time-series images and analyzing positional coordinate information on the correlated feature points, a three-dimensional patch group generating unit for generating three-dimensional patch groups constituting the surface of the target object on the basis of the feature points for which the three-dimensional position information has been found and supplying the three-dimensional patch groups as information on a model of the target object to an output section.

20 Claims, 14 Drawing Sheets

IMAGE PROCESSING APPARATUS AND IMAGE PROCESSING METHOD

BACKGROUND OF THE INVENTION

The present invention relates to an image processing apparatus and image processing method used for three-dimensional CAD (computer-aided design) for aiding in designing industrial parts and so on, the creation of images using three-dimensional CG (computer graphics), or HI (human interface) using portraits, and mobile robots, and suitable for aiding in forming the 3D model of objects.

The present invention relates to an image processing apparatus and method for realizing a head-tracking for following the movement of the head of a person, a video compression capable of decreasing the data amount required for image communication by extracting the motion vector of the person in teleconference, videophone, and the like, three-dimensional pointer for performing pointing on a virtual reality including application to games, and so on.

Recently, there have been increasing demands for computer processes relating to the images which includes image generation, image processing, and image recognition, such as three-dimensional CAD (computer-aided design) for aiding in designing industrial parts, the creation of images using three-dimensional CG (computer graphics), or HI (human interface) using portraits.

In those processes, it is necessary to digitize the geometrical shape of a target object, its surface attribute and, if necessary, the motion data before inputting them. The input processing is refereed to as modeling and the digitized data inputted is called a model. At present time, the modeling work requires a lot of manual labor. Therefore, there have been strong demands for automation from the points of view of productivity and cost.

In this connection, the approach of automatically determining the shape and surface attribute of a target object by analyzing the images obtained from a camera. Specifically, an attempt has been made to effect the automatic modeling of an object in the environment by the stereographic method of determining the distance under the principle of triangulation using a plurality of cameras or by the approach of determining the distance by analyzing the images obtained by changing the focal length of a single camera.

When only a single camera is used, the object has to stay still in changing the focal length. When a plurality of cameras are used in the stereoscopic method, cost is higher than when a single camera is used. To shoot a moving object in different directions with a single camera and use the stereographic method, this type of device provides more sensory operation than the three-dimensional mouse, it has disadvantages in that the user has to wear special gloves. Three-dimensional pointing by use of the whole body requires the sensing of the posture and the head's movement. To do this, a special device provided with a sensor has to be put on each section to be sensed. This is not practicable.

To overcome this problem, the following method can be considered: the movement of the operator is shot with a television camera; the movement and state of the image is analyzed; and three-dimensional pointing is done to give operation instructions on the basis of the result of the analysis. This enables the operator to give instruction by moving the operator's fingers and body, which makes it easier to operate the system. Therefore, this method seems to solve the problem at a stroke.

The concrete steps to solve the problem are now under study. At present, any practical approach for the problem has not been established yet.

In the fields of teleconference and videophone, efforts have been made to reduce the amount of transmitted data by using the technique for storing specific models beforehand, generating a blink or creating the shape of a mouth according to speech, and adding these to the models. Presently, however, the the problem of correlating the direction of an object with the relative change of the direction of illumination must be solved yet. This problem, however, has not been solved. Accordingly, the technique for automatically creating a model of a moving object in a complex shape, such as the head of a person, with a practical accuracy and processing speed has not been achieved yet.

In recent years, as images using three-dimensional CG (computer graphics), not two-dimensional CG, are being used more and more in the field of video games and VR (virtual reality), the need for a three-dimensional mouse serving as a pointing device for three-dimensional images has been increasing. To meet the need, various types of three-dimensional mouse have been developed.

For instance, a three-dimensional mouse enabling movement and a pointing action in a three-dimensional space by the operation of the buttons on the device has been developed. Although three-dimensional pointing can be done, it is difficult for users to do work in a three-dimensional space because the display on which images appear is two-dimensional.

Gloves provided with sensors for sensing the movement of the joint portions of fingers or the like have also been developed. Users can do work in a three-dimensional space, wearing the gloves. Although technique for acquiring information on the movement of a target object in the image has not been established.

As described above, with the conventional methods, when the focal length is changed, the object must keep still. Using a plurality of cameras in the stereographic method costs more than using a single camera.

To shoot a moving object in different directions with a single camera and use the stereographic method, the problem of correlating the direction of an object with the relative change of the direction of illumination must be solved yet. This problem, however, has not been solved. Therefore, it has been impossible to form a practical model of a moving object in a complex shape, such as the head of a person.

BRIEF SUMMARY OF THE INVENTION

A first object of the present invention is to provide an image processing apparatus and image processing method that are capable of automatically creating a model of a moving object in a complex shape, such as the head of a person, by use of a single camera with a practical accuracy and processing speed.

A second object of the present invention is to provide an image processing apparatus and image processing method which enables users not only to do three-dimensional pointing sensuously by analyzing the position and posture of an object on the basis of the moving images of the object but also to do pointing or tracking without putting devices on the portions to be analyzed.

According to a first aspect of the present invention, there is provided an image processing apparatus comprising: an image capture section for taking in images obtained in time series by capturing an image of a target object; a feature point extraction section for extracting feature points of the target object from the time-series images taken in by the image capture section; a three-dimensional position information extraction section which finds three-dimensional position information by correlating the feature points contained in the image at a point in time with those at another point in time in the time-series images extracted by the feature point extraction section and analyzing positional coordinate information on the correlated feature points; a three-dimensional patch group generating circuit which generates three-dimensional patch groups constituting the surface of the target object on the basis of three-dimensional position information on the feature points obtained by the three-dimensional position information extraction section; and an output section for outputting the three-dimensional patch groups generated by the three-dimensional patch group generating section as information on a model of the target object.

The three-dimensional position information extraction section is characterized by choosing the image at time A in the time-series images and correlating the sensed feature points contained in the image at time A with the sensed feature points contained in the image at time B different from time A in such a matter that the feature points are correlated with each other using information on the change of the position in the image at time A from the position in the image at time B.

The three-dimensional patch group generating section is characterized by finding three-dimensional patch groups constituting the surface of the target object using three-dimensional position information on the feature points and information on the brightness in the image of the feature points.

The three-dimensional patch group generating section is characterized by estimating a three-dimensional curve surface patch passing the feature points corresponding to the three-dimensional position information and determining a direction parameter for the three-dimensional curve surface patch by comparing information on the brightness at the feature points for which the three-dimensional position information has been found or the brightness at the feature points contained in the three-dimensional curve surface patch with information on the brightness at the projection points of the feature points for which the three-dimensional position information has been found or the brightness at the projection points of the feature points contained in the three-dimensional curve surface patch.

Namely, with the present invention, the time-series images obtained by shooting the target object are used. The feature points contained in the image at a point in time are correlated with the feature points contained in the image at another point in time in the time-series images. Three-dimensional position information is found from position coordinate information on the correlated feature points. On the basis of the three-dimensional position information on the feature points, a three-dimensional patch group constituting the surface of the target object is formed. The patch group is outputted as information on a model of the target object.

With this configuration, a model of a moving object in a complex shape, such as the head of a person, can be made automatically. Because modeling is done using a plurality of moving pictures, it is possible to effect the modeling with a higher accuracy and processing speed than by a conventional method using still pictures.

According to a second aspect of the present invention, there is provided an image processing apparatus comprising: an image capture section for taking in images obtained in time series by capturing an image of a target object; a feature point extraction section for extracting feature points of the target object from the time-series images taken in by the image capture section; a decision section which decides the change of the position and posture of the target object in each point in time in the time-series images by correlating the feature points contained in the image at a point in time with those at another point in time in the time-series images extracted by the feature point extraction section and analyzing positional coordinate information on the correlated feature points; a calculation section which calculates the linear combination coefficient between the time-series images by analyzing information on the luminance at the correlated feature points and the luminance around the correlated feature points; and an estimation section which estimates information on the distance to each point of the target object from the determined position and posture of the target object at each point in time in the time-series images and the calculated linear combination coefficient between the time-series images.

The estimation section for estimating information on the distance to the target object includes a selection section which chooses as a reference image the image at a specific time A from the time-series images, sets the distance Z of each pixel to the target object in the reference image, evaluates the distance Z under a geometric condition and a photometric condition, and determines pixels corresponding to each of the pixels in the image groups at three or more points in time different from the specific time A from the distance Z and the determined position and posture at each point in time of the target object, a calculation section which calculates the degree of the matching of the luminance at the corresponding pixels with the luminance at the pixels in the reference image using the calculated linear combination coefficient between the time-series images, and an evaluation section which evaluates the distance Z estimated according to the degree of the matching and estimates the distance information on the basis of the evaluation.

Namely, with the present invention, the time-series images obtained by electrically capturing the target object are used. The feature points contained in the image at a point in time are correlated with the feature points contained in the image at another point in time in the time-series images. A geometric coupling condition between the time-series images is found according to the three-dimensional position and posture of the target object at each point in time from position coordinate information on the correlated feature points. On the basis of information on the luminance at the correlated feature points, an optical coupling condition between the time-series images is calculated. Under the geometric and optical conditions, information on the distance of each pixel to the target object is acquired. The acquired information is outputted as information on a model of the target object.

With this configuration, a model of (or numerical data on) a moving object in a complex shape, such as the head of a person, can be made automatically using a single camera as an input device.

According to a third aspect of the present invention, there is provided an image processing apparatus for tracking a target object contained in a moving picture, comprising: a feature point extraction section for extracting feature points of a target object at each point in time from the images of the target object obtained in time series; a three-dimensional position information extraction section which finds three-dimensional position information on the feature points by correlating the feature points extracted at each point in time by the feature point extraction section with each other between the time-series images and analyzing positional coordinate information on the correlated feature points; and an estimation section which estimates at least one of the position and posture of the target object at each point in time in the time-series images on the basis of three-dimensional position information on the feature points obtained by the three-dimensional position information extraction section.

With this configuration, feature points of the target object are extracted at each point in time from the images of the target object obtained in time series. The feature points contained in the image at a point in time are correlated with the feature points contained in the image at another point in time in the time-series images. Three-dimensional position information on the feature points is found by analyzing position coordinate information on the correlated feature points. At least one of the position and posture of the target object at each point in time in the time-series images is estimated on the basis of the three-dimensional position information on the feature points.

As described above, tracking and the acquisition of information on the position and posture can be effected easily by extracting the feature points of the target object from the time-series images obtained by electrically capturing the target object and tracking the feature points over the images.

Furthermore, the decision section for deciding the posture of the target object is characterized by including a section which generates a three-dimensional curved surface patch that passes the feature points for which the three-dimensional position information has been found and that holds information on the brightness at the feature points and around them on the surface of the target object and an estimation section which estimates the position and posture of the target subject at each point in time in the time-series images by comparing the generated three-dimensional patch groups with the image of the target object at each point in time in the time-series images on the basis of three-dimensional position information on the feature points through which the three-dimensional patch groups have passed.

Furthermore, the comparison section for comparing the generated three-dimensional patch groups with the image of the target object at each point in time in the time-series images is characterized by including a section which expresses information on the brightness of the three-dimensional patches by the linear combination of image basis and creates a synthesized image corresponding to various postures that the target object will possibly take, evaluates the individual postures according to the similarity of the generated image to the image of the target object, and estimates the posture on the basis of the evaluation.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, referring to the accompanying drawings, embodiments of the present invention will be explained.

An image processing apparatus capable of automatically creating a model of a moving object in a complex shape, such as the head of a person, with a practical accuracy and processing speed, for example, an image processing apparatus for automatically creating a surface model of the head of a person, will be explained as a first embodiment of the present invention.

Figure 1:
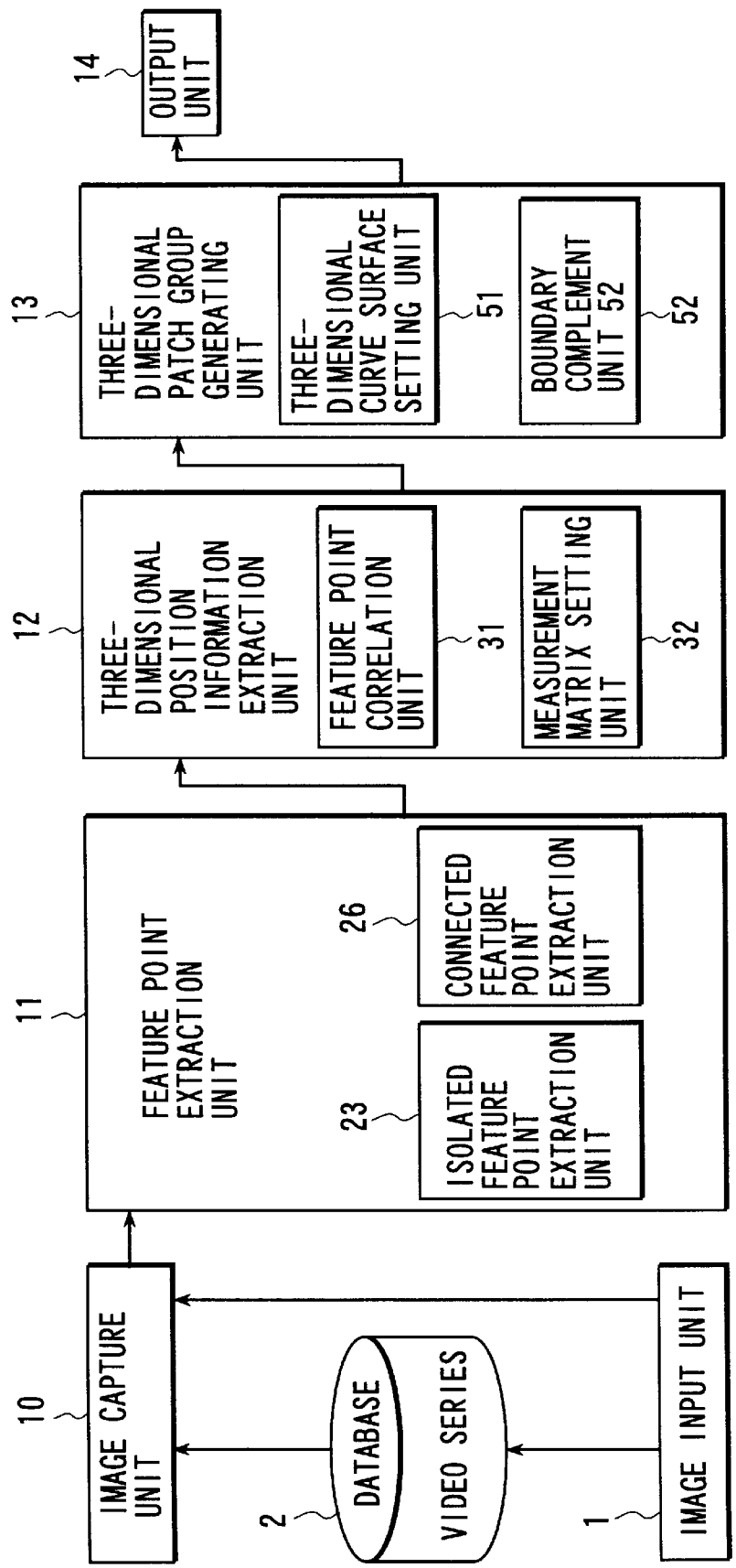
FIG. 1 is a block diagram of the overall configuration of an image processing apparatus according to a first embodiment of the present invention.

As shown in FIG. 1, the image processing apparatus according to the first embodiment comprises an image input unit 1, a database 2, an image capture unit 10, a feature point extraction unit 11, a three-dimensional position information extraction unit 12, a three-dimensional patch group generating unit 13, and an output unit 14.

The image input unit 1 comprises, for example, a single television camera for electrically capturing a target object to be subjected to modeling. The database 2 is a memory for storing time-series images (a moving picture series) inputted by the image input unit 1. The image capture unit 10 takes in the time-series images of the target object inputted in real time by the image input unit 1 or the time-series images of the target object stored in the database 2.

The feature point extraction unit 11 extracts feature points of the target object from the time-series images taken in by the image capture unit 10. The feature point extraction unit 11 comprises an isolated feature point extraction unit 23, a connected feature-point extraction unit 26. A detailed configuration of the feature point extraction unit 11 will be explained later by reference to FIG. 4.

The three-dimensional position information extraction unit 12 determines three-dimensional position information by correlating the feature points contained in the image at a point in time with those at another point in time in the time-series images extracted by the feature point extraction unit 11 and analyzing position coordinate information on the correlated feature points. The three-dimensional position information extraction unit 12 comprises a feature point correlation unit 31, and a measurement matrix setting unit 32. A detailed configuration of the three-dimensional position information extraction unit 12 will be explained later by reference to FIG. 5.

The three-dimensional patch group generating unit 13 creates the three-dimensional patch groups constituting the surface of the target object on the basis of the three-dimensional information on the feature points obtained by the three-dimensional position information extraction unit 12. The three-dimensional patch group generating unit 13 comprises a three-dimensional curve-surface setting unit 51, and a boundary complement unit 52. A detailed configuration of the three-dimensional patch group generating unit 13 will be explained later by reference to FIG. 4.

The output unit 14 is composed of, for example, an information output device, such as a display or a printer. The output unit 14 outputs the three-dimensional patch groups generated by the three-dimensional patch group generating unit 13 as information on a model of the target object.

Figure 2:
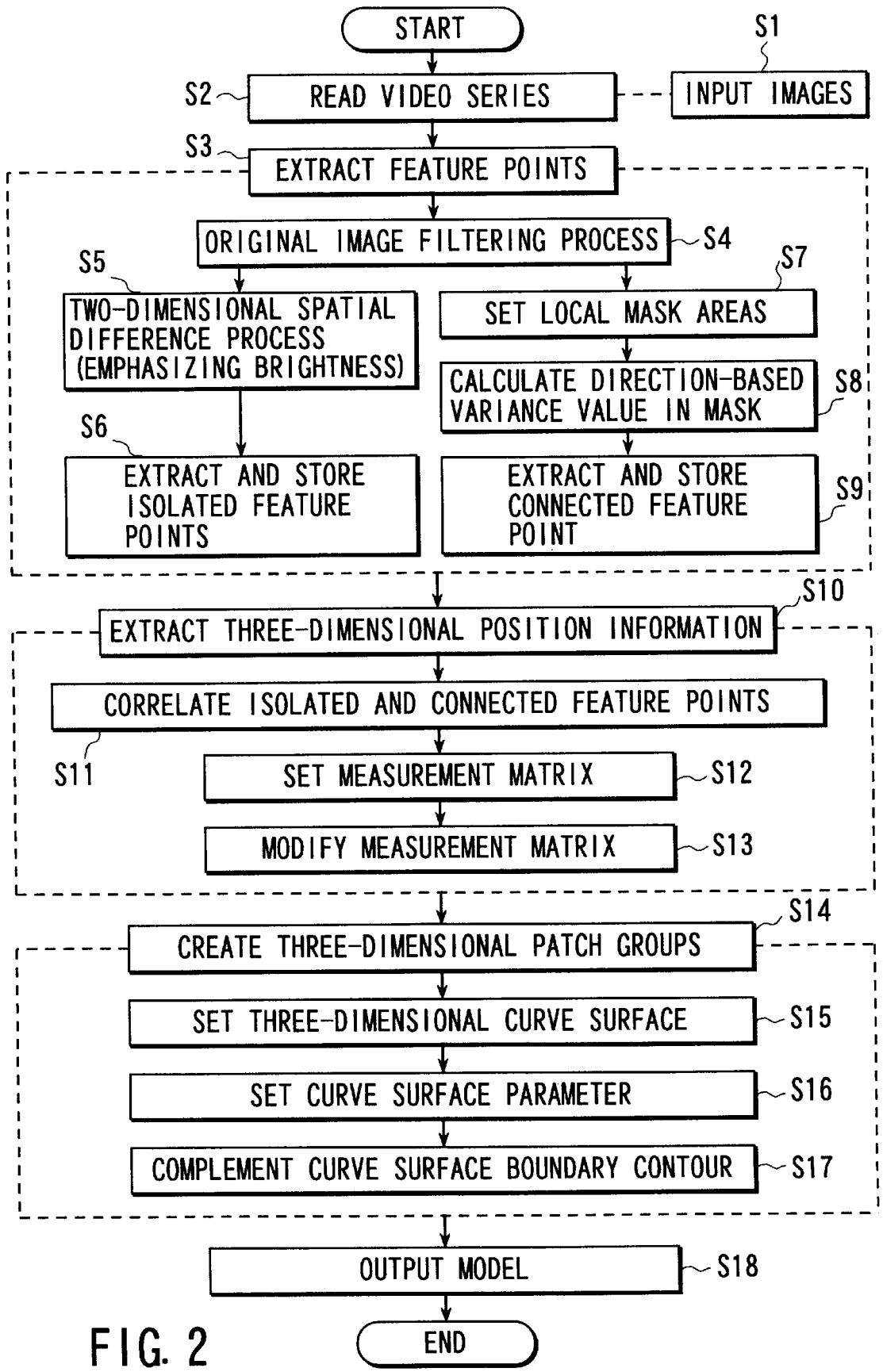
FIG. 2 is a flowchart to help explain the whole processing related to the first embodiment of the present invention.

Next, the configuration of each section of the apparatus will be explained by reference to a flowchart in FIG. 2.

Figure 3:
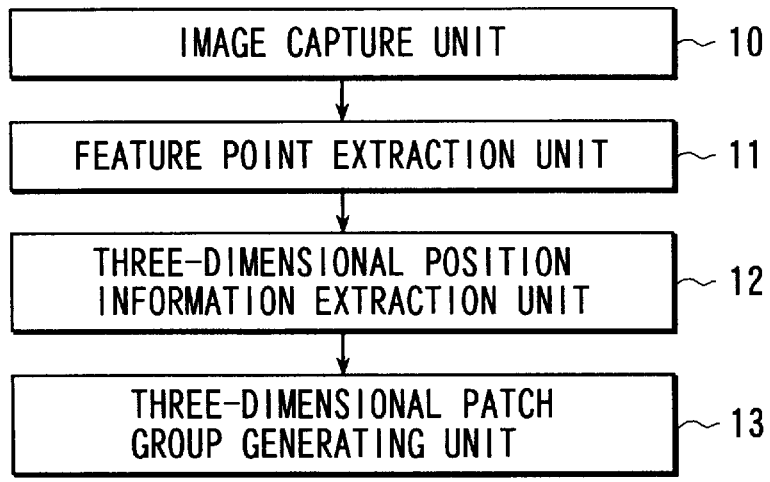
FIG. 3 is a block diagram of the basic configuration of the system according to the first embodiment.

FIG. 3 is a block diagram of a basic configuration of the moving image processing apparatus according to the present invention. The apparatus comprises primarily the image capture unit 10, feature point extraction unit 11, three-dimensional information extraction unit 12, and three-dimensional patch group generating unit 13.

With this configuration, the image capture unit 10 takes in time-series images (a moving picture series) of the target object (steps S1, S2 in FIG. 2) and the feature point extraction unit 11 extracts the feature points constituting the surface of the object whose model is to be made (step S3). The time-series images (a moving picture series) may be not only what are shot by a television camera but also previously acquired images.

Next, the three-dimensional position information extraction unit 12 correlates the extracted feature points with each other between the consecutive images and determines three-dimensional information (in the directions of X, Y, and Z) at each feature point by modifying the relation containing, in the form of a coefficient matrix, the matrix generated from position coordinate information (in the direction of X and Y) on the correlated feature point groups (step S10).

Finally, on the basis of the feature points about which three-dimensional information has been acquired, the three-dimensional patch group generating unit 13 generates three-dimensional patch groups, which are fundamental factors constituting the surface of the object (step S14). The generated three-dimensional patch groups are supplied as model information on the target object to the output unit 14 (step S18).

A detailed configuration and concrete operation of each of the feature point extraction unit 11, three-dimensional position information extraction unit 12, and three-dimensional patch group generating unit 13 will be explained.

Figure 4:
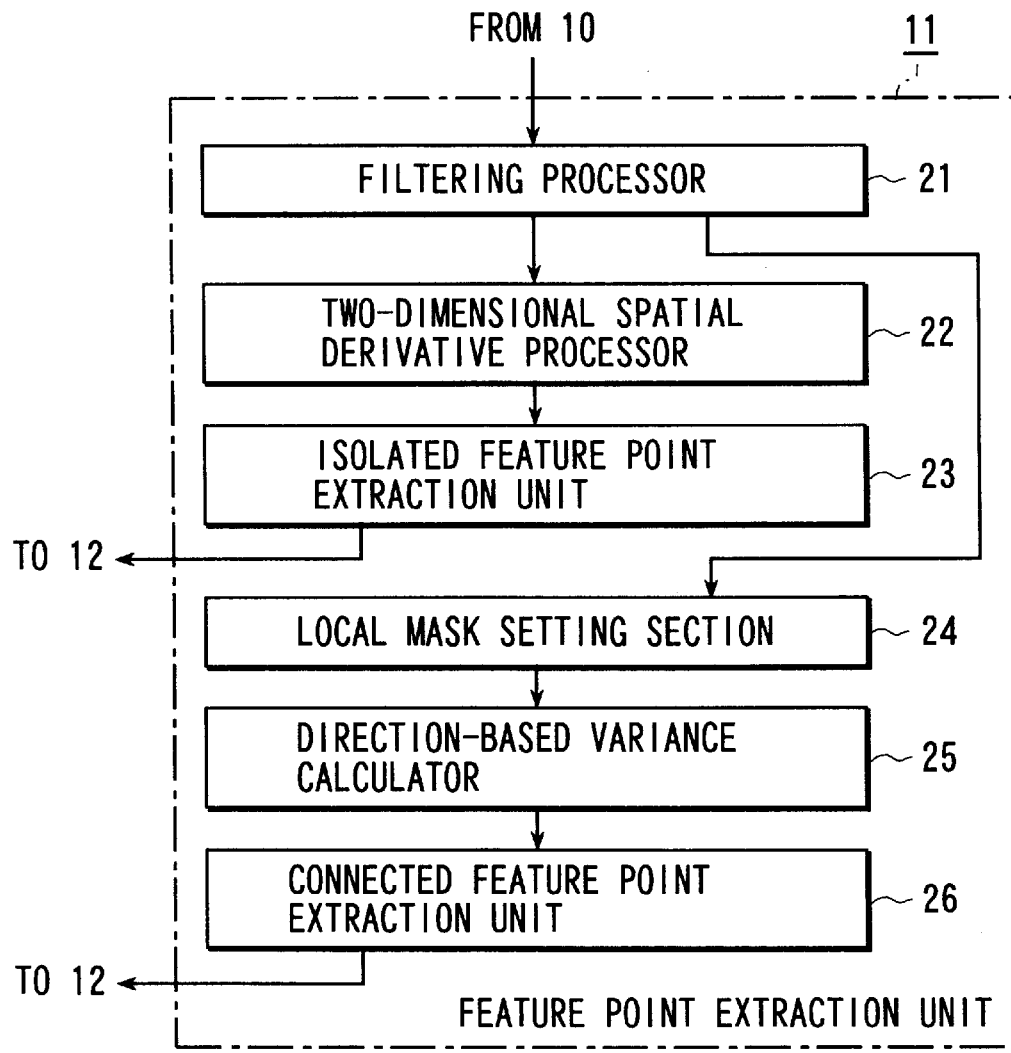
FIG. 4 is a detailed block diagram of the feature point extraction unit of FIG. 3 in the system of the first embodiment.

FIG. 4 is a detailed block diagram of the feature point extraction unit 11. The feature point extraction unit 11 comprises a filtering processor 21, a two-dimensional spatial derivative processor 22, an isolated feature point extraction unit 23, a local mask setting section 24, a direction-based variance calculator 25, and a connected feature-point extraction unit 26.

In the feature point extraction unit 11, the filtering processor 21 performs a filtering process on the original image to be extracted (step S4). When the process is realized using a digital filter, a spatial filter of size 3 having the coefficient expressed by equation (1) can be used:

$$\begin{bmatrix} 1 & 1 & 1 \\ 1 & 1 & 1 \\ 1 & 1 & 1 \end{bmatrix} \quad (1)$$

The filtering process is carried out as pre-processing to reduce noise in the two-dimensional spatial derivative processor 22 and direction-based variance calculator 25.

Next, the two-dimensional spatial derivative processor 22 emphasizes the brightness of the isolated feature points by performing a two-dimensional spatial derivative process on the images subjected to filtering at the filtering processor 21 (step S5). When the process is realized using a digital spatial filter, a spatial filter of size 3 having the coefficient expressed by equation (2) can be used:

$$\begin{bmatrix} 0 & -1 & 0 \\ -1 & 4 & -1 \\ 0 & -1 & 0 \end{bmatrix} \quad (2)$$

The isolated feature point extraction unit 23 extracts isolated feature points, such as a mole in the head by extracting the feature points larger than a specific threshold value from the result of emphasizing the brightness at the two-dimensional spatial derivative processor 22, and stores the coordinates of the extracted feature points in sequence in a storage section (not shown) (step S6).

Next, the local mask setting section 24 sets local mask areas for extracting connected feature points, such as the outer corner of the eye or the ends of the lips in the head, in the image filtered at the filtering processor 21 (step S7). The connected feature points are found in the form of the portions where a plurality of contours (edges) intersect each other: for example, the outer corner of the eye is determined as the point where the upper contour of the eye intersects the lower contour, and the ends of the lips are determined as the points where the contour of the upper lip crosses the contour of the lower lip. The size of a local mask area is set beforehand so as to be optimal according to the length of the contours (edges) constituting the feature points to be extracted.

Next, the direction-based variance calculator 25 computes the variance by direction in each of the set local masks. The direction includes, for example, four directions: a vertical direction, a horizontal direction, a direction at 45 degrees to the right, and a direction at 45 degrees to the left. The direction-based variance calculator 25 computes the variance value in each of the four directions using the brightness of the consecutive pixels in each direction in the local mask (step S8).

Finally, the connected feature point extraction unit 26 extracts, as a connected feature point, the central point of the local masks where the direction-based variance value obtained at the direction-based variance calculator 25 is larger than a specific value in two or more directions. Then, the connected feature point extraction unit 26 stores the coordinates of the feature point in a storage section (not shown) (step S9).

Figure 5:
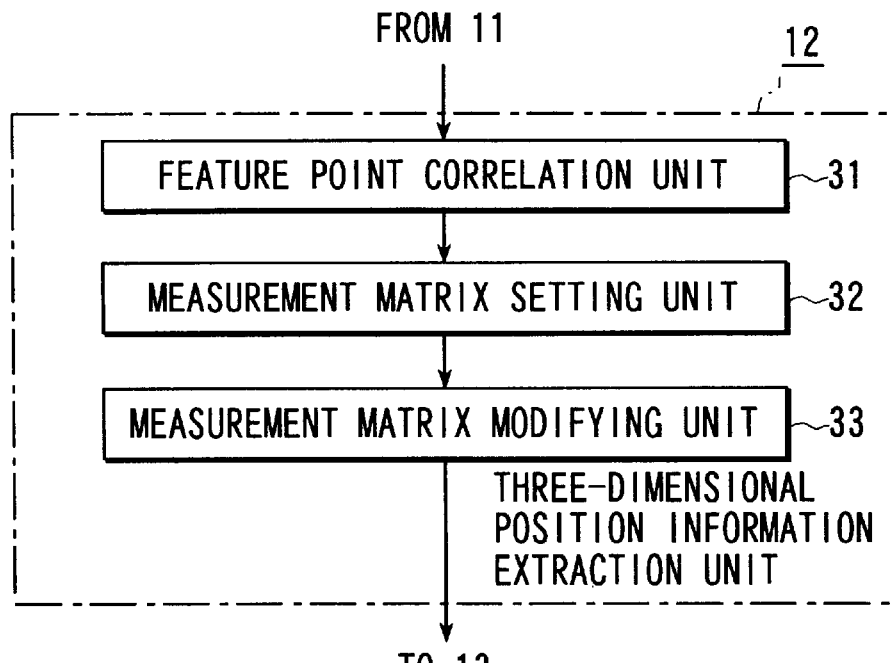
FIG. 5 is a detailed block diagram of the three-dimensional position information extraction unit of FIG. 3 in the system of the first embodiment.

FIG. 5 is a detailed block diagram of the three-dimensional position information extraction unit 12. The three-dimensional position information extraction unit 12 comprises the feature point correlation unit 31, the measurement matrix setting unit 32, and a measurement matrix modifying unit 33.

In the three-dimensional position information extraction unit 12, the feature point correlation unit 31 correlates the isolated feature point groups extracted at the feature point extraction unit 11 and the connected feature point groups between the consecutive time-series images (step S10). Specifically, the feature point correlation unit 31 chooses the image of time A from the time-series images. Then, it correlates each of the sensed feature points contained in the image of time A with each of the sensed feature points contained in the image of time B different from time A. In this case, the feature points have to be correlated with each other using at least four images.

Figure 6:
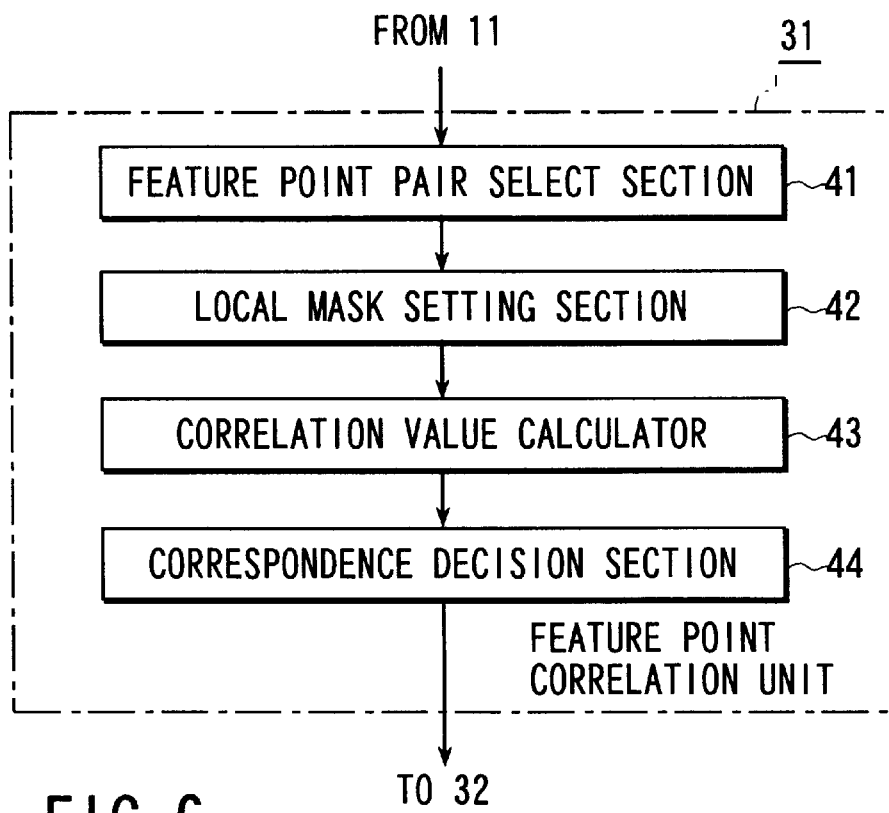
FIG. 6 is a detailed block diagram of the feature point correlation unit of FIG. 5 in the system of the first embodiment.

FIG. 6 shows a detailed configuration of the feature point correlation unit 31. The feature point correlation unit 31 comprises a feature point pair select section 41, a local mask setting section 42, a correlation value calculator 43, and a correspondence decision section 44.

First, the feature point pair select section 41 chooses a set of feature points to be correlated with each other between the consecutive time-series images. Then, the local mask setting section 42 sets a local mask area including the feature points in each image. The correlation value calculator 43 computes a value of a correlation coefficient between the local mask areas.

Next, the correspondence decision section 44 performs the process of determining a set of feature points whose correlation coefficient is larger than a specific threshold value and the largest to be the one already correlated with each other and stores the set in a storage section (not shown). The correspondence decision section 44 carries out the process for each of the extracted feature points.

The measurement matrix setting unit 32 creates a measurement matrix for determining a three-dimensional position using the coordinates of the correlated feature points caused (step S12). In the embodiment, explanation will be given of an example of applying a factorization method to a case where the target object whose model is to be made is sufficiently far away from a camera used for observation (or meets the orthogonal projection condition).

In the set of the correlated feature points, it is assumed that the position of the p-th feature point in the f-th image is at (Xfp, Yfp). It is also assumed that the sum total of images is F and the number of sets of feature points is P. If the position of the center of gravity of a P number of feature points in the f-th image is at (Af, Bf), Af and Bf are expressed by equation (3):

$$Af = \frac{1}{P}\sum_{P=1}^{P} Xfp \quad Bf = \frac{1}{P}\sum_{P=1}^{P} Yfp \quad (3)$$

Finding the difference between these gives:

$$X'fp = Xfp - Af \quad Y'fp = Yfp - Bf \quad (4)$$

Here, a measurement matrix W is expressed by equation (5).

$$\begin{bmatrix} X'11 & X'12 & \ldots & X'1P \\ \ldots & \ldots & \ldots & \ldots \\ X'F1 & X'F2 & \ldots & X'FP \\ Y'11 & Y'12 & \ldots & Y'1P \\ \ldots & \ldots & \ldots & \ldots \\ Y'F1 & Y'F2 & \ldots & Y'FP \end{bmatrix} \quad (5)$$

The measurement matrix W is a 2F×P matrix.

Next, the measurement matrix modifying unit 33 modifies the measurement matrix W to resolve W into the product of two matrices (step S13):

$$W = MS \quad (6)$$

where M=(I1, ..., IF, J1, ..., JF) is a 2F×3 matrix and S=(S1, S2, ..., SP) is a 3×P matrix. The resolution is realized using a singular value decomposition process.

Of the elements of matrix M, (If, Jf) is a fundamental vector for the f-th image and gives the central position of the image at each point in time in the moving picture series. The difference between the central point at one time and that at another time produces the motion of images. Element Sp in S is the three-dimensional position (Xp, Yp, Zp) of the correlated p-th feature point.

The three-dimensional patch group generating unit 13 generates three-dimensional patch groups using these values. In general, when a patch (the smallest unit of a plane passing the feature points) is generated by connecting the feature points to one another, this gives an unnaturally uneven shape (because it is made up of a set of planes), which is unsuitable for CG models. To overcome the problem, the present invention provides a generating unit for generating smooth, natural three-dimensional patch groups by estimating and complementing the optimum curve-surface patch (a directional patch) passing the individual feature points.

Figure 7:
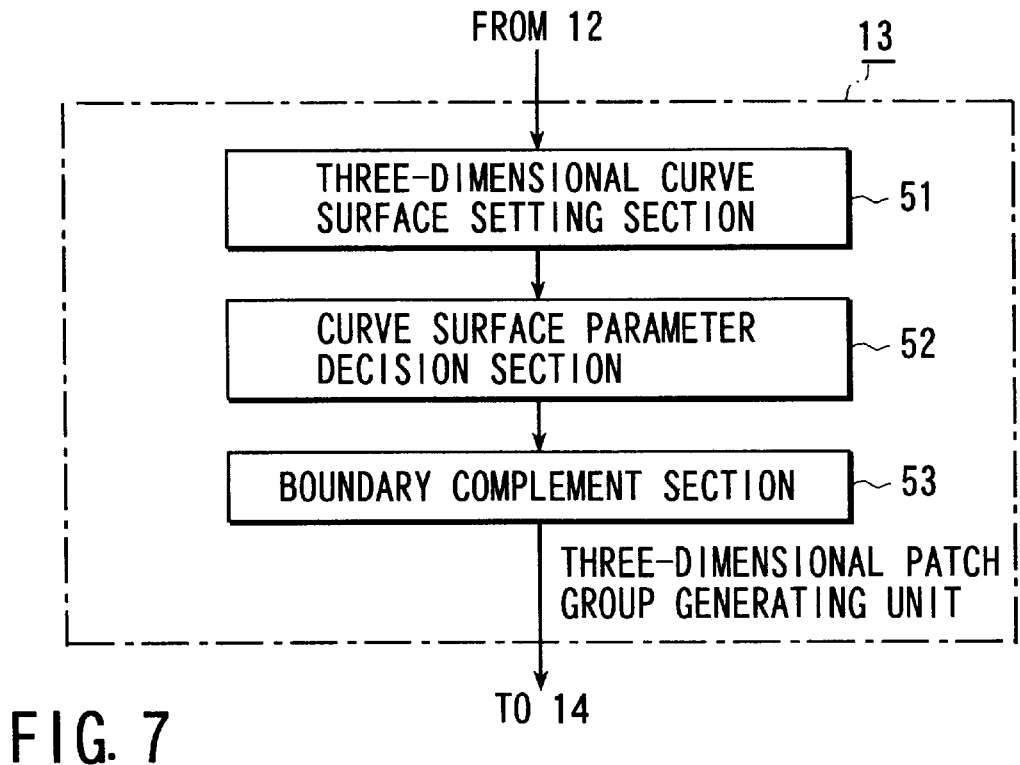
FIG. 7 is a detailed block diagram of the three-dimensional patch group generating unit of FIG. 3 in the system of the first embodiment.

FIG. 7 is a detailed block diagram of the three-dimensional patch group generating unit 13. The three-dimensional patch group generating unit 13 comprises a three-dimensional curve-surface setting section 51, a curve-surface parameter decision section 52, and a boundary complement section 53.

The three-dimensional curve-surface setting section 51 sets a curved surface passing the point for each of the feature points in the three-dimensional position information obtained by the three-dimensional position information extraction unit 12 (step S15). In the embodiment, plane Dg in direction g is set as a curve surface.

Next, the curve-surface parameter decision section 52 determines each parameter for the curve surface (step S16). In the embodiment, an example of determining direction g of a plane patch will be described using a case where the object is made up of a diffuse reflection surface like the head of a person.

The brightness Ii(j) at the i-th feature point xi(j) of the j-th image is calculated using equation (7) based on the theory of optics:

$$Ii(j) = Bis(j), s(j) = \sum_{k=1}^{nk} R(j)Dk(j)Sk \tag{7}$$

where Bi is a unit normal vector, R(j) is a rotation matrix covering the first image to the j-th image, nk is the number of light sources, and Sk is the intensity vector of the k-th illumination. These are assumed to be given in advance. Dk(j) is a function which takes a value of 1 when the point faces the k-th illumination, but otherwise takes a value of 0.

If an equation for plane Dg is ax+by+cz+d=0, the relation with point Xi(j) on the patch corresponding to xi(j) will be expressed by equation (8):

$$xi(j)=P(j)DgHgXi(j) \tag{8}$$

where P(j) is a 3×4 projection matrix, Hg is a 3×3 matrix, and Dg is a conversion matrix expressed by equation (9):

$$Dg = \begin{bmatrix} 1 & 0 & 0 \\ 0 & 1 & 0 \\ 0 & 0 & 1 \\ -a/d & -b/d & -c/d \end{bmatrix} \tag{9}$$

P(j) is determined unequally from the fundamental vector of each image and three-dimensional position information on each feature point obtained at the three-dimensional position information extraction unit 12. In the embodiment, Hg is determined to be a unit matrix I.

A direction parameter for the three-dimensional curve-surface patch is determined by finding g which minimizes the error Eg (equation (10)) between Ii(j) given by equation (7) and the luminance I(P(j)DgHgXi(j)) in the image at the point calculated using equation (8), while changing parameter g using the above result:

$$Eg=|Ii(j)-I(P(j)\,Dg\,Hg\,Xi(j))| \tag{10}$$

Finally, the boundary complement section 53 creates a smooth, natural three-dimensional patch as a whole by complementing the boundary contour of each of the obtained curved surfaces using continuous functions (step S17). For example, when a plane passing the individual feature points is used as a curve-surface patch, a three-dimensional patch is formed by using the intersection lines of the individual planes as a boundary.

By the above process, a model of a smooth moving object, such as the head, is formed automatically in the form of a three-dimensional patch by use of a single camera. Because modeling is done using a plurality of moving pictures, modeling is effected at higher speed with higher accuracy than a conventional method using still pictures.

The present invention is not limited to what has been explained in the first embodiment.

For instance, the connected feature points can be found in the form of portions of the contour edge where the curvature changes greatly by subjecting the images to a one-dimensional spatial derivative filter at the feature point extraction unit 11 to emphasize the contour edge instead of calculating the direction-based variance value in a local mask.

The three-dimensional position information extraction unit 12 may be provided with the function of enabling manual selection of feature points contained in the target object to create a model stably in an environment where objects other than the target object are present.

Figure 8:
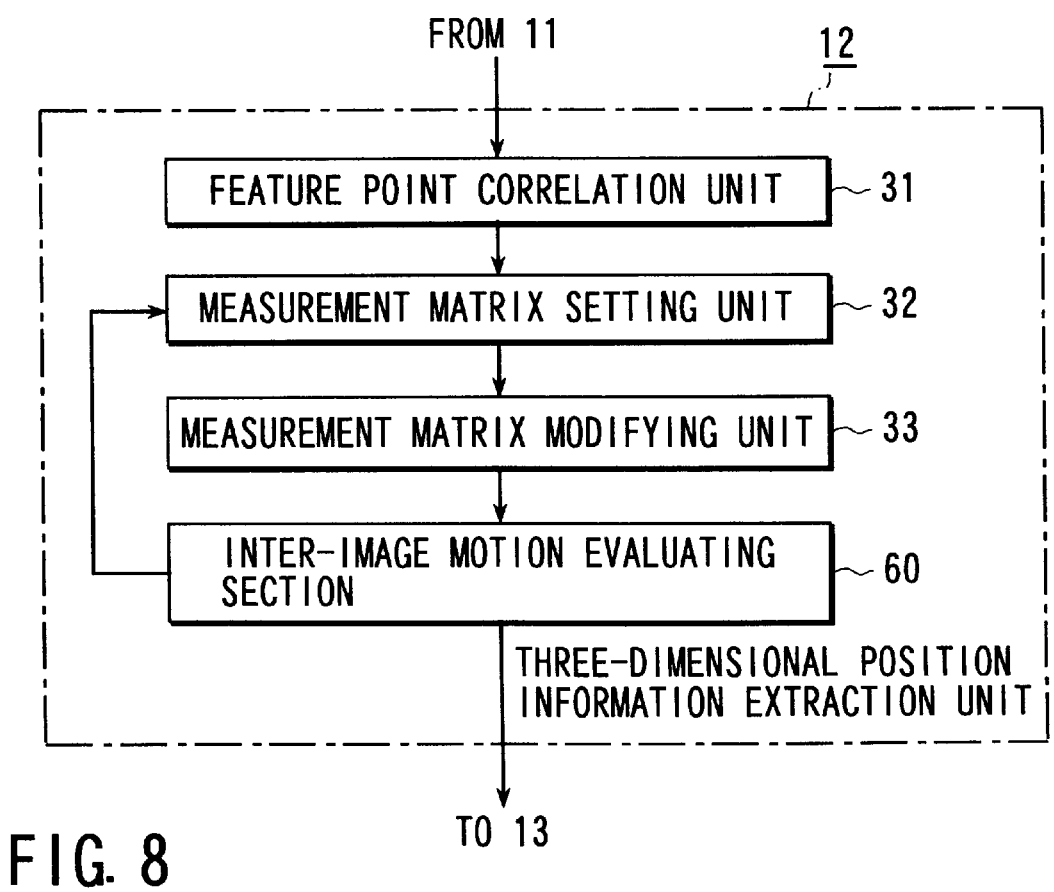
FIG. 8 is a detailed block diagram of a modification of the three-dimensional position information extraction unit of FIG. 3 in the system of the first embodiment.

In the three-dimensional position information extraction unit 12, to create a model stably in an environment where objects other than the target object are present, an inter-image motion evaluating section 60 that finds the central position of the image at each point in time in the moving picture series from matrix M obtained at the measurement matrix modifying unit 33 and evaluates the difference (inter-image motion) is added as shown in FIG. 8. According to the evaluation result of the inter-image motion evaluating section 60, the measurement matrix setting unit 32 may be caused to change the feature points to be chosen. This provides the function of choosing feature points contained in the object to be modeled as a group of feature points giving the optimum motion information.

While in the three-dimensional patch group generating unit 13, the intensity vector Sk of the k-th illumination is given beforehand, it may be found by analyzing the matrix determined from the brightness of each feature point at a plurality of points in time.

While in the embodiment, the curve-surface parameter decision section 52 in the three-dimensional patch group generating unit 13 determines the direction of the curved surface (plane) patch using information on the brightness of the feature points on which three-dimensional position information has been obtained, the direction may be determined by giving the size of the patch in advance and finding g which minimizes Eg computed using equation (11) on the basis of brightness information on each point included in the patch:

$$Eg = \sum_{m=1}^{nm} |Iim(j) - I(P(j)Dg\ Hg\ Xim(j))| \quad (11)$$

where Xik(j) is he k-th point on the i-th patch. The point in the j-th image corresponding to the k-th point is determined to be xik(j) and the brightness of this point is Iim(j). The number of points on the patch is represented by nm.

The boundary complement section 53 in the three-dimensional patch group generating unit 13 may calculate a curve surface for complementing all of the patch groups smoothly by specifying the organization of patches and the curve surface may be used as a new three-dimensional patch.

Figure 9:
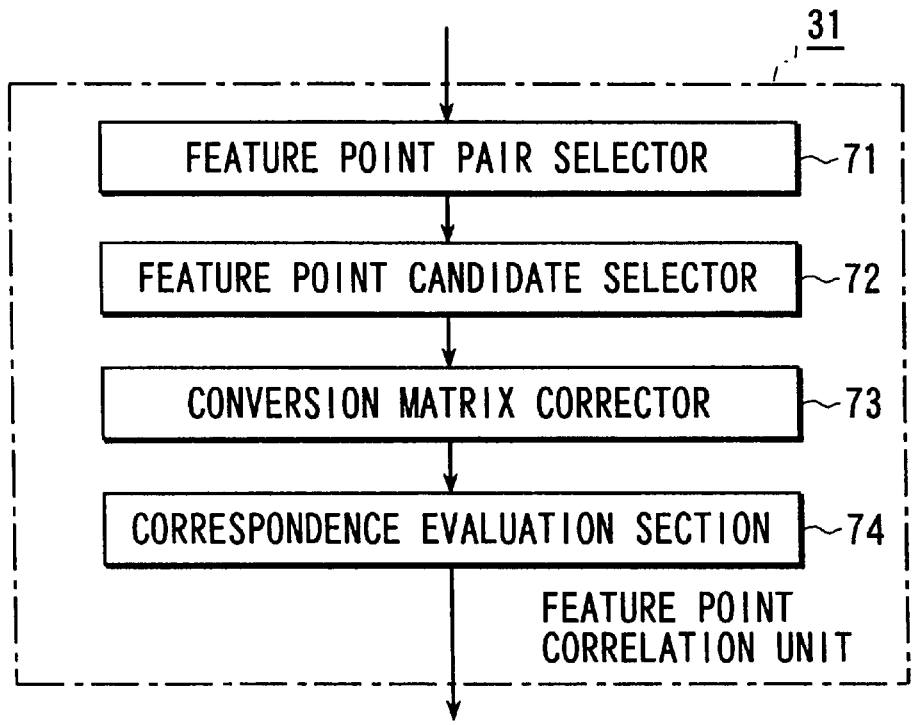
FIG. 9 is a detailed block diagram of a modification of the feature point correlation unit of FIG. 5 in the system of the first embodiment.

The feature point correlation unit 31 of FIG. 6 in the three-dimensional position information extraction unit 12 can increase the reliability of correlation by performing repetitive processes. FIG. 9 shows a modification of this.

Specifically, a feature point pair select section 71 first chooses candidates for feature point pairs on the basis of the correlation between local mask areas. Next, a corresponding point candidate select section 72 chooses at least seven feature point pairs at random from the feature point pair candidates obtained at the feature point pair select section 71. On the basis of the feature points chosen by the corresponding point candidate select section 72, a conversion matrix correction section 73 calculates a conversion matrix between two images including the feature points.

A correspondence evaluation section 74 evaluates the calculated conversion matrix. The evaluation method may be, for example, to pick out the candidates not used in calculating the conversion matrix from the feature point pair candidates obtained at the feature point pair select section 71 and make evaluation on the basis of the number of those of the unused candidates compatible with the calculated conversion matrix.

A conversion matrix given the highest evaluation as a result of repeating the processes from the corresponding point candidate select section 72 to the correspondence evaluation section 74 is determined to be a fundamental matrix between two images.

The feature point pairs picked out at random by the corresponding point candidate select section 72 to form the fundamental matrix are added to the feature point pair candidates compatible with the fundamental matrix. The addition result is determined to be the correlation-completed feature points. Using the correlation-completed feature points, a conversion matrix between two images is calculated again and the result is determined to be an updated fundamental matrix. Finally, under the restrictions put by the determined fundamental matrix, feature point pairs are searched for and the acceptable pairs are added to the set of the correlation-completed feature points, thereby producing the highly reliable result of correlation.

The feature point correlation unit 31 in the three-dimensional position information extraction unit 12 may be provided with means for increasing the reliability of correlation by reference to information on the change of the position of the corresponding point candidate for each feature point in the image.

For example, it is assumed that the positional coordinates of feature point P at time 1 is P1(x1, y1), the positional coordinates of feature point P1 at time 2 is P2(x2, y2), and the positional coordinates of feature point P3 at time 3 is P3(x3, y3). Under the continues constraint condition for motion during a continuous period of time, vector P1P2 and vector P2P3 can be considered to be almost equal. Namely, the following expression (12) holds:

$$\overrightarrow{P1P2} + \overrightarrow{P3P2} \cong \overrightarrow{0} \quad (12)$$

Only the candidates for which, for example, the value of a function of coordinate |2×2−x1−x3|+|2y2−y1−y3| is smaller than a preset threshold value Th are selected using the expression, thereby producing the highly reliable correlation.

As described above, the present invention may be practiced or embodied in still other ways without departing from the spirit or essential character thereof.

With the configuration of the first embodiment, a model of a moving object in a complex shape, such as the head of a person, can be made automatically. Because modeling is done using a plurality of moving pictures, modeling is effected at higher speed with higher accuracy than a conventional method using still pictures.

Hereinafter, an image processing apparatus and image processing method according to a second embodiment of the present invention will be explained. By the modeling process of digitizing the geometric shape of a target object, its surface attribute and, if necessary, data on the motion, the image processing apparatus and image processing method can make a model of a moving object in a complex shape, such as the head of a person, automatically by use of a single camera with a practical accuracy and processing speed.

The second embodiment intends to make a model (a numerical data model) of a moving object in a complex shape, such as the head of a person, automatically by use of a single camera as an input device.

Therefore, the second embodiment differs in the contents from the techniques proposed in, for example, U.S. Pat. No. 5,475,422 (U.S. Pat. No. 5,475,422 issued Dec. 12, 1995 to NTT, "Method and apparatus for reconstructing three-dimensional objects").

To calculate the motion of a target object in the embodiment, the factorization method by C. Tomasi, et al. (reference 2: C. Tomasi and T. Kanade, "Shape and motion from image streams under orthography: A factorization method," International Journal of Computer Vision Vol.9:2, pp.137–154, 1992) is used. In the method, the three-dimensional positions of the points chosen uniquely by a single blow calculation are determined simultaneously. The modeling based on the extrapolation of them has been explained in the first embodiment.

The second embodiment intends to reconstruct all of the three-dimensional surface of a target object by the stereographic method based on correlation and therefore differs from the first embodiment in the frame of modeling.

The second embodiment which creates a surface model of the head of a person automatically will be explained.

Figure 10:
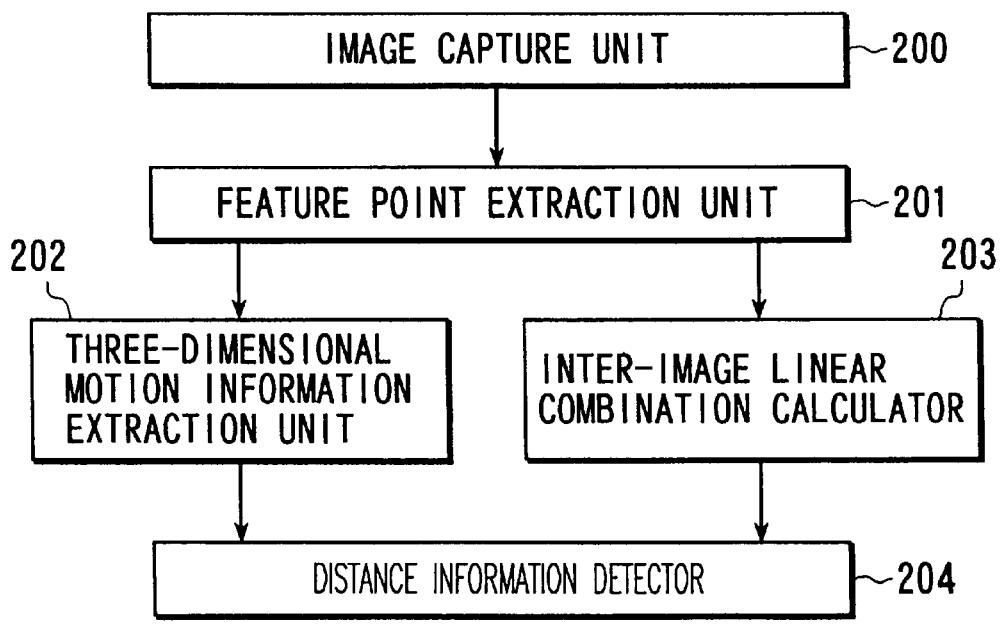
FIG. 10 is a block diagram of the overall configuration of an image processing apparatus according to a second embodiment of the present invention.
Figure 11:
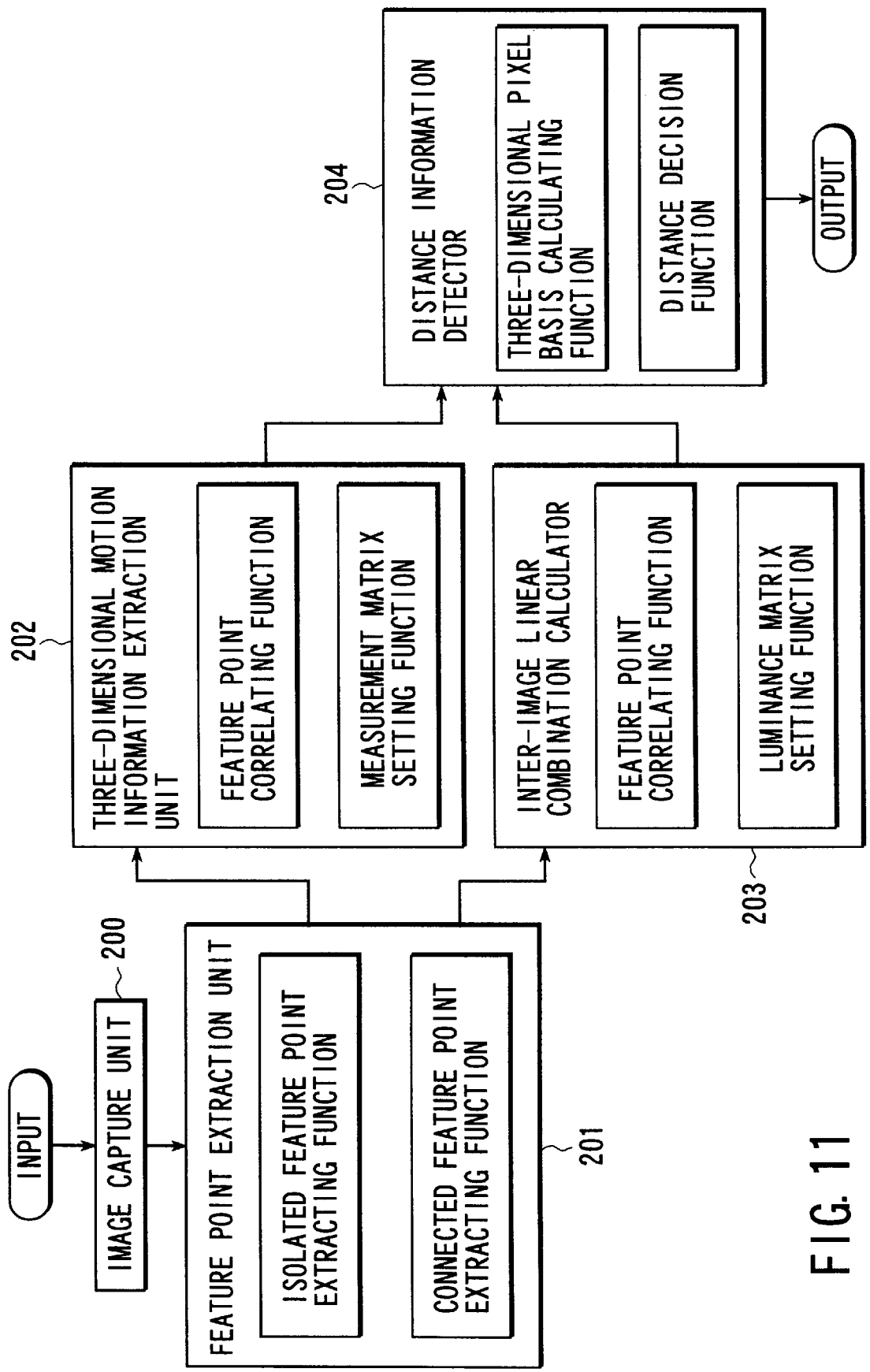
FIG. 11 is a block diagram of the basic configuration of the image processing apparatus according to the second embodiment.

FIG. 10 shows a basic configuration of the second embodiment and FIG. 11 shows a detailed configuration of the second embodiment. In the second embodiment, as shown in FIG. 10, the image processing apparatus of the second embodiment basically comprises an image capture unit 200, a feature point extraction unit 201, a three-dimensional motion information extraction unit 202, a linear combination coefficient calculator 203, and a distance information detector 204. The feature point extraction unit 201 has an isolated feature point extraction function and a connected feature-point extraction function. The three-dimensional motion information extraction unit 202 has a feature point correlation function and a measurement matrix setting function. The linear combination coefficient calculator 203 has a feature point correlation function and a luminance matrix setting function. The distance information detector 204 has a three-dimensional basic pixel calculating function and a distance decision function.

The image capture unit 200 takes in moving pictures. The feature point extraction unit 201 extracts feature points constituting the surface of an object whose model is to be made from the moving picture series obtained by the image capture unit 200. The three-dimensional motion information extraction unit 202 gets information on the feature points from the feature point extraction unit 201, correlates the extracted feature points with each other between the consecutive images, and determines the position and posture of the head by modifying a relation containing as a coefficient matrix the matrix generated from the two-dimensional coordinates of the group of the correlated feature points.

The distance information detector 204 detects information on the distance to the object and reconstructs the shape according to the position and posture of the head and the linear combination coefficient between images determined by the linear combination coefficient calculator 203 under the geometric luminance constraint condition.

With the apparatus of this configuration, the feature point extraction unit 201 extracts feature points constituting the surface of the object whose model is to be made from the moving picture series obtained from the image capture unit 200. That is, the feature point extraction unit 201 extracts the necessary feature points for the formation of a model. Next, the three-dimensional motion information extraction unit 202 correlates the extracted feature points with each other between the consecutive images. It then determines the position and posture of the head by modifying a relation containing, as a coefficient matrix, the matrix generated from the two-dimensional coordinates of the group of the correlated feature points. That is, the three-dimensional motion information extraction unit 202 correlates the extracted feature points with each other between the consecutive images and obtains information on the motion of the target object, or information on the change of the three-dimensional position and posture from information on the positional coordinates of the feature point group.

The linear combination coefficient calculator 203 determines a linear combination coefficient between images by modifying a relation containing, as a coefficient matrix, the matrix generated from information on the luminance of each of the correlated feature points. That is, it determines a linear combination constraint which holds between the time-series images.

Finally, the distance information detector 204 detects information on the distance to the object and reconstructs the shape according to the position and posture of the head and the linear combination coefficient between images under the geometric luminance constraint condition. Specifically, the distance information detector 204 determines a three-dimensional shape of the object by finding the distance of each point in the image according to the geometric luminance constraint condition.

As described above briefly, use of the stereographic method based on correlation enables the reconstruction of all of the three-dimensional surface of the target object.

Explanation of each of the components in the basic configuration will be given. First, the feature point extraction unit 201 will be explained in detail.

Figure 12:
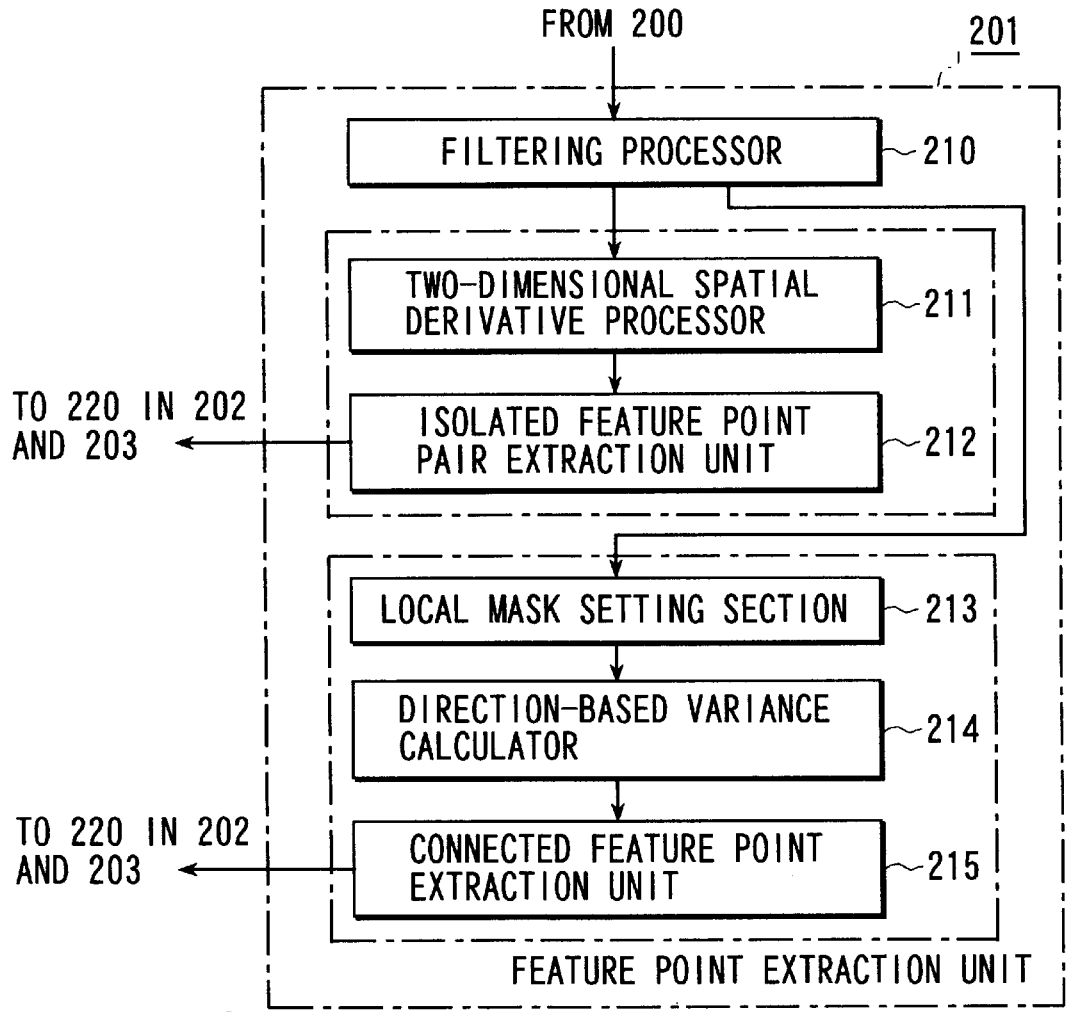
FIG. 12 is a detailed block diagram of the feature point extraction unit of FIGS. 10 and 11 in the image processing apparatus of the second embodiment.

FIG. 12 shows a detailed configuration of the feature point extraction unit 201. The feature point extraction unit 201 h as an isolated feature point extracting function and a connected feature-point extracting function. The isolated feature point extracting function is realized by a two-dimensional spatial derivative processor 211 and an isolated feature point pair extraction section 212. The connected feature-point extracting function is realized by a local mask setting section 213, a direction-based variance calculator 214, and a connected feature-point extraction section 215. A filtering processor 210 is provided at the input stage of the isolated feature point extracting function and connected feature-point extracting function. Before these functions take in the moving picture series data from the image capture unit 200, the filtering processor 210 performs a filtering process on the moving picture series data.

The filtering processor 210 subjects the original images to be extracted to filtering to effect pre-processing to reduce noises at the two-dimensional spatial derivative processor 211 and the direction-based variance calculator 214 in subsequent stages.

The two-dimensional spatial derivative processor 211 emphasizes the brightness of the isolated feature points by performing a two-dimensional spatial derivative process on the pre-processed original image (the result of the filtering process). The isolated feature point pair extraction section 212 has the function of extracting the isolated feature points in the images by extracting the portions for which the result of emphasizing the brightness is larger than a suitably set threshold value and storing the coordinates of the feature points in a storage section (not shown) in sequence.

The local mask setting section 213 sets a local mask area used to extract consecutive feature points in the image for the result of the filtering result at the filtering processor 210.

The direction-based variance calculator 214 computes the variance value by direction in each of the set local masks. The direction includes, for example, four directions: a vertical direction, a horizontal direction, a direction at 45 degrees to the right, and a direction at 45 degrees to the left. The direction-based variance calculator computes the variance value in each of the four directions using the brightness values of the consecutive pixels in each direction in the local mask.

The connected feature point extraction unit 215 extracts, as a connected feature point, the central point of the local masks where the direction-based variance value obtained at the direction-based variance calculator 214 is larger than a specific value in two or more directions. Then, the connected feature point extraction unit stores the coordinates of the feature point in a storage section (not shown).

In the feature point extraction unit 201, the filtering processor 210 performs a filtering process on the original image to be extracted. When the process is realized using a digital filter, a spatial filter of size 3 having the coefficient expressed by equation (1) can be used.

This process is carried out as a pre-processing for noise reduction at the two-dimensional spatial derivative processor 211 and direction-based variance calculator 214. The two-dimensional spatial derivative processor 211 emphasizes the brightness of the isolated feature points by performing a two-dimensional spatial derivative process on the result of the filtering process. When the process is realized using a digital spatial filter, a spatial filter of size 3 having the coefficient expressed by equation (2) can be used.

The isolated feature point extraction unit 212 extracts an isolated feature point, such as a mole in the head, by extracting a portion for which the result of emphasizing the brightness is larger than the suitably set threshold value, and stores the coordinates of the feature point in a storage section (not shown). Next, the local mask setting section 213 sets local mask areas used to extract connected feature points, such as the outer corner of the eye or the ends of the lips in the head, for the result of the filtering processor 210.

The connected feature points are found in the portions where a plurality of contours (edges) intersect each other: for example, the outer corner of the eye is determined to be the point where the upper contour of the eye intersects the lower contour, and the ends of the lips are determined to be the points where the contour of the upper lip crosses the contour of the lower lip. The size of a local mask area is set beforehand so as to be optimum, taking into account the length of the contours (edges) constituting the feature points to be extracted and the necessary amount of calculation.

Next, the direction-based variance calculator 214 computes the variance value by direction in each of the set local masks.

The direction includes, for example, four directions: a vertical direction, a horizontal direction, a direction at 45 degrees to the right, and a direction at 45 degrees to the left. The direction-based variance calculator computes the variance value in each of the four directions using the brightness values of the consecutive pixels in each direction in the local mask. Next, the connected feature point extraction unit 215 extracts, as a connected feature point, the central point of the local masks where the direction-based variance value obtained at the direction-based variance calculator 214 is larger than a specific value in two or more directions. Then, the connected feature point extraction unit stores the coordinates of the feature point in a storage section (not shown).

In this way, the feature point extraction unit 201 extracts the feature points constituting the surface of the object whose model is to be made, from the moving picture series obtained at the image capture unit 200.

Figure 13:
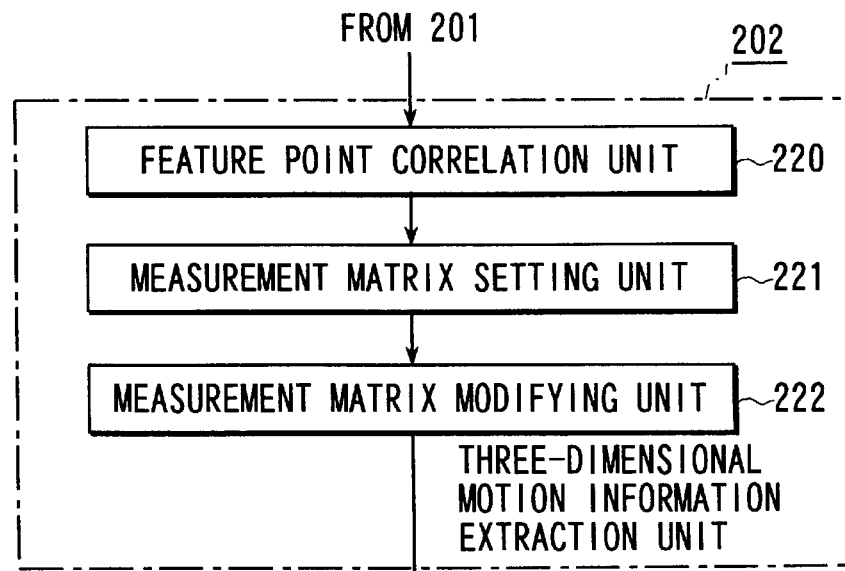
FIG. 13 is a detailed block diagram of the three-dimensional motion extraction unit of FIGS. 10 and 11 in the image processing apparatus of the second embodiment.

Next, a detailed configuration of the three-dimensional motion information extraction unit 202 will be described by reference to FIG. 13.

The three-dimensional motion information extraction unit 202 has a feature point correlating function and a measurement matrix setting function. As shown in FIG. 13, the feature point correlating function is realized by a feature point correlation unit 220 and the measurement matrix setting function is realized by a measurement matrix modifying unit 222.

The three-dimensional motion information extraction unit 202 correlates the isolated feature point group extracted at the feature point extraction unit 201 and the connected feature point group with each other between the consecutive time-series images. The measurement matrix setting unit 221 creates a measurement matrix for finding three-dimensional motion information using the coordinates of the correlated feature points in the image. The measurement matrix modifying unit 222 modifies the measurement matrix to resolve it into the product of two matrices and determines three-dimensional motion information on the object between frames. This makes it possible to calculate the coordinates of the corresponding points in another image from the coordinates of a given point on the input image at a point in time in the moving picture series and the distance estimated up to that point.

In the three-dimensional motion information extraction unit 202, the feature point correlation unit 220 correlates the isolated feature point groups and connected feature point groups extracted at the feature point extraction unit 201 with each other between the consecutive time-series images.

Figure 14:
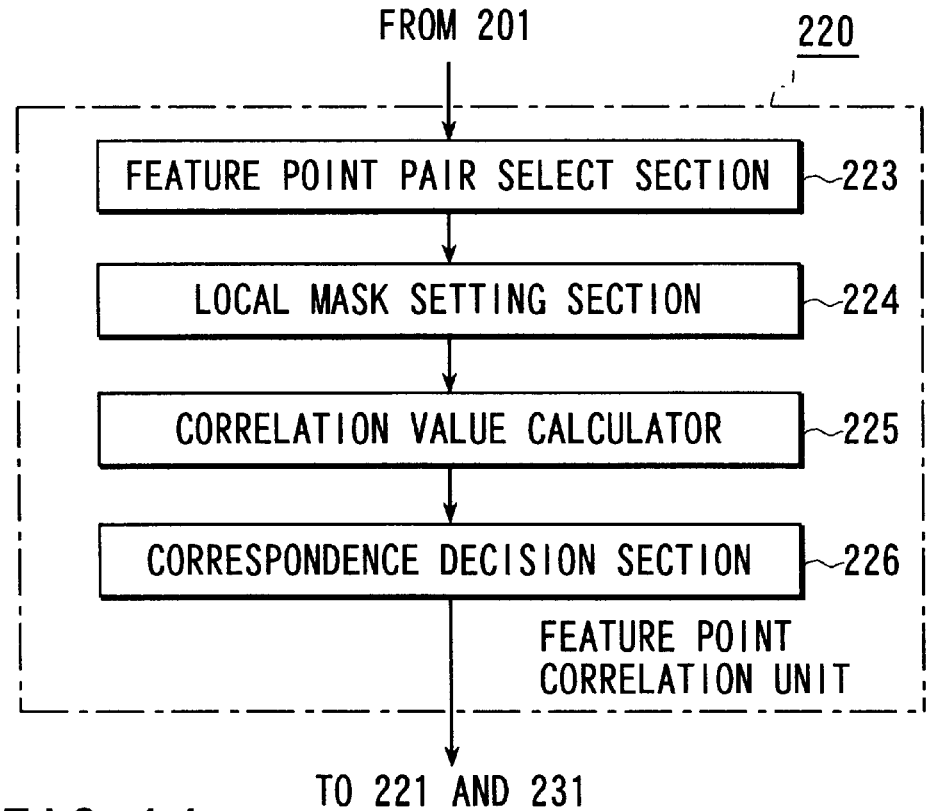
FIG. 14 is a detailed block diagram of the feature point correlation function that the three-dimensional motion information extraction unit and inter-image linear combination coefficient calculator of FIGS. 10 and 11 have in the image processing apparatus of the second embodiment.

The feature point correlation unit 220 is a functional element shared by the inter-image linear combination coefficient calculator 203. FIG. 14 shows a detailed configuration of the feature point correlation unit 220.

As shown in FIG. 14, the feature point correlation unit 220 comprises a feature point pair select section 223, a local mask setting section 224, a correlation coefficient calculator 225, and a correspondence decision section 226.

In the feature point correlation unit 220, the feature point pair select section 223 selects a set of feature points to be correlated between the consecutive time-series images. Next, the local mask setting section 224 sets a local mask area of the size of, for example, 5×5 or 7×7 including the feature points in each image.

Next, the correlation coefficient calculator 225 finds a correlation coefficient between the local mask areas. Then, the correspondence decision section 226 performs the process of determining a set of feature points whose correlation coefficient is larger than a specific threshold value and the largest to be the one already correlated with each other and stores the set in a storage section (not shown). The correspondence decision section 226 carries out the process for each of the extracted feature points.

In this way, the feature point correlation unit 220 correlates the isolated feature point group extracted at the feature point extraction unit 201 and the connected feature point group with each other between the consecutive time-series images.

After the feature point correlation unit 220 has completed the correlation process, it sends the result of the process to the measurement matrix setting unit 221. The measurement matrix setting unit 221 creates a measurement matrix used to find three-dimensional motion information using the coordinates of the correlated feature points in the image.

In the second embodiment, explanation will be given of an example of applying a factorization method to a case where the target object whose model is to be made is sufficiently far away from a camera used for observation (or meets the orthogonal projection condition).

When, for example, the face is electrically captured, the orthogonal projection condition will be usually met even if a camera is not placed far away. In the set of correlated feature points, the position of the p-th feature point in the f-th image is assumed to be (Xfp, Yfp).

It is assumed that the sum total of images is F and the number of sets of feature points is P. If the position of the center of gravity of the set of feature points in the f-th image is at (Af, Bf), Af and Bf are expressed by equation (3). The difference between the coordinates is expressed as follows:

$$X'fp=Xfp-Af, \quad Y'fp=Yfp-Bf \tag{13}$$

Here, measurement matrix W is expressed by equation (4). The measurement matrix w is a 2F×P matrix.

Next, the measurement matrix modifying unit 222 modifies the measurement matrix W to resolve W into the product of two matrices in accordance with equation (6). In this case, M is a 2F×3 matrix and S is a 3×P matrix. Where M and S are represented as follows:

$$M=(x_1, \ldots, x_F, y_1, \ldots, y_F)^T \tag{14}$$

$$S=(S_1, S_2, \ldots, S_P) \tag{15}$$

The resolution is realized using a singular value decomposition process.

Here, component $S_p$ in matrix S is the three-dimensional position $(X_p, Y_p, Z_p)$ of the correlated p-th feature point.

Of the elements of matrix M, (xf, yf) is a fundamental vector for the f-th image and gives the central position of the image at each time in the moving picture series. On the basis of the difference between the central point at one time and that at another time, it is possible to determine information on the three-dimensional motion of the object between frames, that is, changes in the position and posture of the object.

Although singular value resolution is usually arbitrary, resolution can be determined uniquely under a suitable restraint condition, such as a condition that the element vectors in matrix M form an orthonormal system (for detailed information, refer to reference 2).

This makes it possible to calculate the coordinates of the corresponding points in another image from the coordinates of a given point on the input image at a point in time in the moving picture series and the distance Z estimated up to that point.

Figure 15:
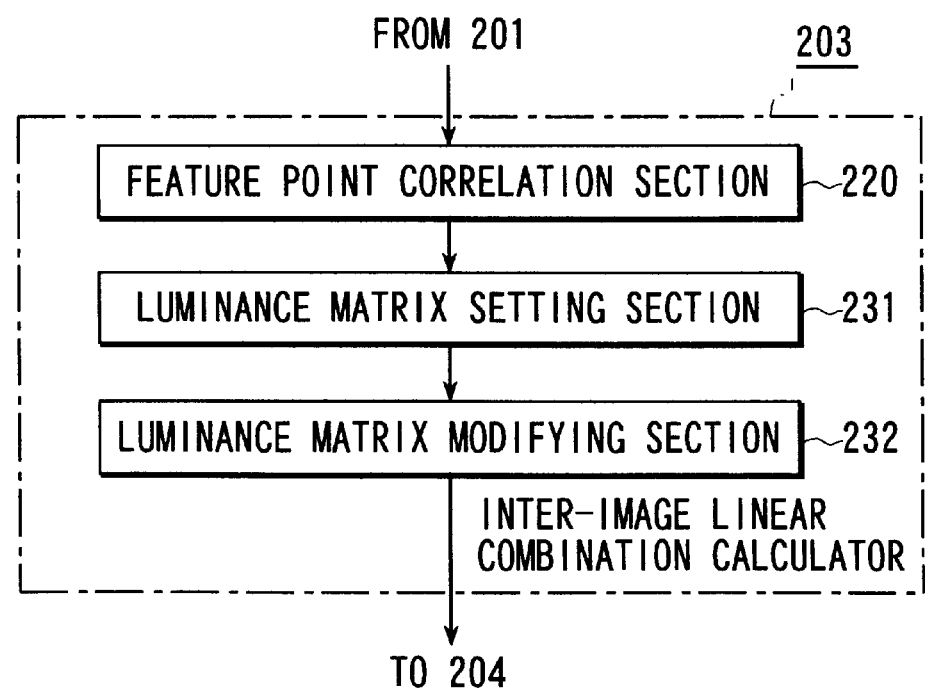
FIG. 15 is a detailed block diagram of the inter-image linear combination coefficient calculator of FIGS. 10 and 11 in the image processing apparatus of the second embodiment.

Next, the inter-image linear combination coefficient calculator 203 will be explained in detail by reference to FIG. 15. The inter-image linear combination coefficient calculator 203 comprises the feature point correlation unit 220, an evaluation function calculator 241, and a distance decision section 242 as shown in FIG. 15. The feature point correlation unit 220 is the same as that of FIG. 14. In the figure, although the three-dimensional motion information extraction unit and inter-image linear combination coefficient calculator 203 have their own feature point correspondence sections, the feature point correlation unit 220 may be shared by the three-dimensional motion information extraction unit and inter-image linear combination coefficient calculator 203.

As described above, the feature point correlation unit 220 correlates the feature points in the moving picture series with each other. It records the luminance value Ii(j) of the correlated feature points in terms of brightness I.

A luminance matrix setting section 231 creates a luminance matrix using the luminance values at the correlated feature points caused and sends the created matrix to a luminance matrix modifying section 232. The luminance matrix modifying section 232 produces an approximate matrix necessary for sensing distance information at the next stage (a distance information detector 204).

Next, the operation of the inter-image linear combination coefficient calculator 203 constructed described above will be explained.

Figure 18:
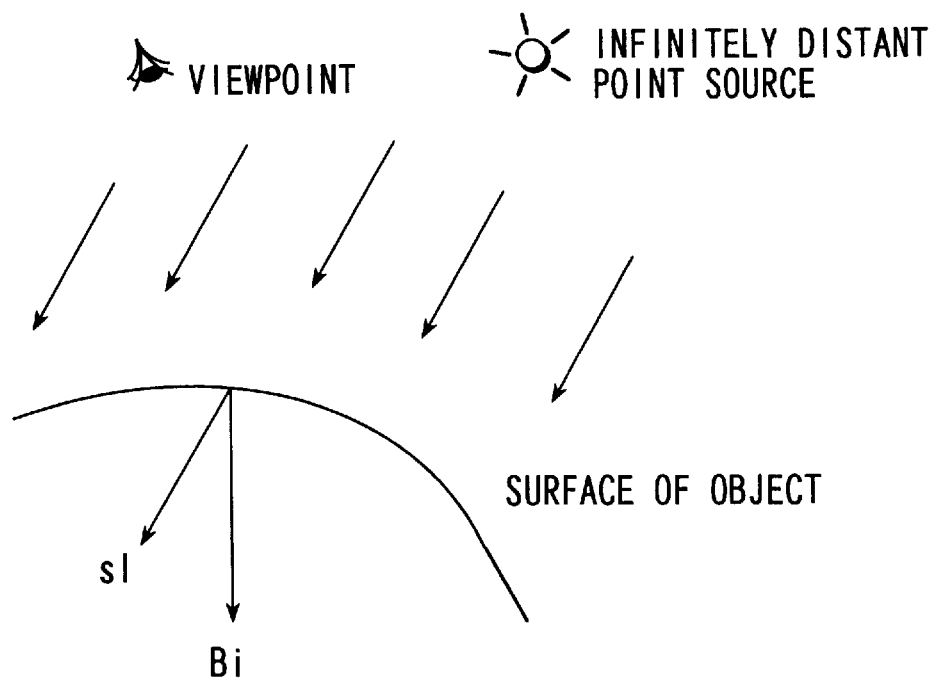
FIG. 18 is a drawing to help explain a surface reflection model of an object used in the image processing apparatus of the second embodiment.

It should be noted that when an infinitely distant point source is used, the luminance I of a pixel xi is expressed as the inner product of the amount Bi and the amount s1, or I=Bis1 (see FIG. 18). The amount Bi is obtained by multiplying the surface reflectivity by the inner three-dimensional unit normal vector at the point on the surface of the object corresponding to the pixel. The amount s1 is obtained by multiplying the intensity of the light source by a three-dimensional unit vector indicating the direction of the light from the point source.

On the basis of the equation, an image of a convex object with a perfect diffuse reflection surface formed under a single point source can be expressed by the linear combination of three image basis formed by shooting the target object under three point sources each in different planes. This has been described in reference 3: A. Shashua "Geometry and photometry in 3D visual recognition," Ph.D.Thesis, Dept. Brain and Cognitive Science, MIT, 1992.

With a point on the surface of the object being projected at point x(j) in the moving picture series, when the reflection under an nk number of point sources in the infinite distance is expressed using a Lambertinan model, the luminance Ii(j) of the i-th point of the j-th image is expressed as:

$$Ii(j) = \sum_{k=1}^{nk} \max(Bi^T R(j)^T s^k, 0) \quad (16)$$

where Bi is the product of an inner unit normal vector on the surface of the object and the surface reflectivity, R(j) is a matrix indicating the rotation of the object covering the first image to the j-th image, and sk is the product of a unit vector representing the direction of the k-th ray of light and the intensity of the light source.

When a certain light source does not illuminate the pixels, the inner product has a negative value and therefore has to be made max(·, 0).

Equation (16) may be expressed as equation (17)

$$Ii(j) = Bi^T s'(j) \quad (17)$$

where $$s'(j) = \sum_{k=1}^{nk} R(j)^T D^k(j) s^k \quad (18)$$

is a factor related to the light source and Dk(j) takes a value of 1 or 0, depending on whether the k-th light source is illuminating the j-th image. When the number of feature points in the image is ni and an nj number of moving pictures are analyzed, luminance I can be expressed by a matrix determined by equation (19):

$$I = Bs \quad (19)$$

where I is an ni×ni matrix containing elements Ii(j), B is an ni×3 matrix, each row expressed by $Bi^T$, and s is a 3×nj matrix, each column expressed by s' (j).

The feature point correlation unit 220 in the three-dimensional motion information extraction unit 202 performs the correlation process on the individual feature points in all of an nj number of moving pictures in the moving picture series. The luminance Ii(j) of the correlated feature points can be recorded in terms of luminance I.

After the luminance of the feature points correlated by the feature point correlation unit 220 has been determined, control proceeds to the luminance matrix setting section 231. The luminance matrix setting section 231 creates a luminance matrix using the luminance at the correlated feature points and sends the matrix to a luminance matrix modifying section 232.

The luminance matrix modifying section 232 produces an approximate matrix necessary for the next stage (the distance information detector 204) to detect distance information as follows.

When a single point source is used, the luminance matrix modifying section 232 provides an approximate expression of a matrix of rank 3 by subjecting the matrix of luminance I or the measurement matrix to, for example, singular value resolution:

$$I = \check{B}\check{s} \quad (20)$$

$$\text{where } \check{B} = [\check{I}_1, \check{I}_2, \check{I}_3] \quad (21)$$

consists of $\check{I}_1$, $\check{I}_2$, and $\check{I}_3$ representing three-dimensional image basis and $$\check{s} = [\check{s}(1), \check{s}(2), \ldots, \check{s}(nj)] \quad (22)$$

is a 3×nj matrix containing linear combination coefficients.

It is well known that resolution based on singular value resolution is not unique and is generally expressed by a 3×3 regular matrix A as follows:

$$\check{B}s = (\check{B}A)(A^{-1}\check{s}) \tag{23}$$

When specific A meets the following:

$$Bs = (\check{B}A)(A^{-1}s) \tag{24}$$

$s=A^{-1}\check{s}$ gives a matrix s containing the direction of light in each column. If a 3×nj matrix containing linear combination coefficients is determined, the matrix will be sufficient for detecting distance information in the next stage.

In this way, the three-dimensional motion information extraction unit 202 correlates consecutive time-series images in the isolated feature point extracted at the feature point extraction unit 201 and the connected feature points with each other. Then, it determines the coordinates of the corresponding point in another image from the coordinates of a given point in the input image at a certain point in time in the moving picture series and the estimated distance to that point.

The determined coordinates are given to the distance information detector 204, which detects distance information.

Figure 16:
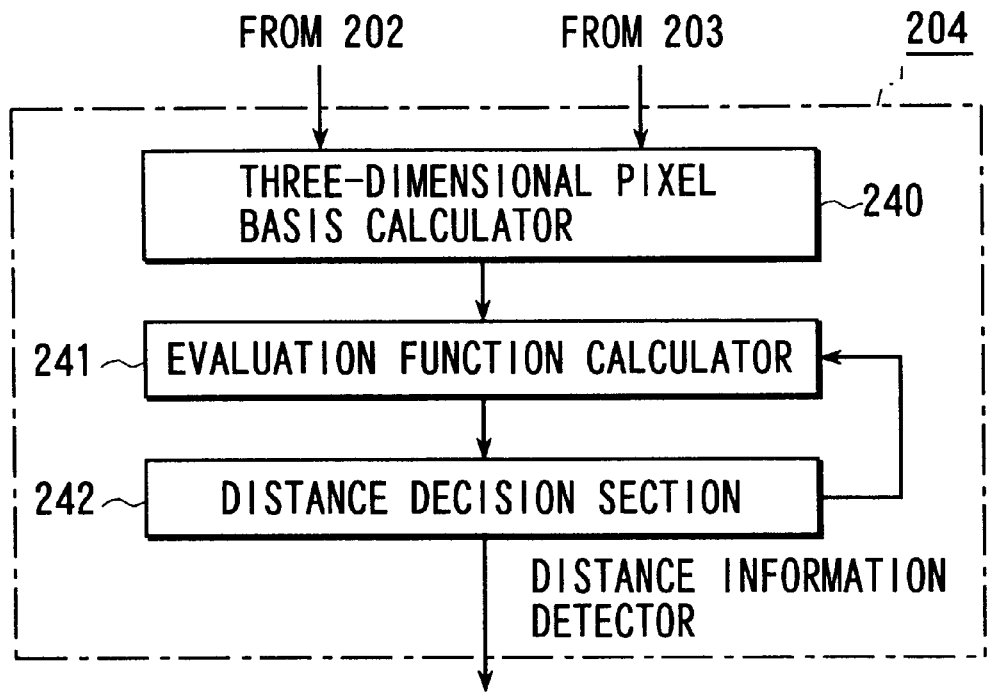
FIG. 16 is a detailed block diagram of the distance information detector of FIGS. 10 and 11 in the image processing apparatus of the second embodiment.

A detailed configuration of the distance information detector 204 will be explained by reference to FIG. 16. The distance information detector 204 comprises a three-dimensional basic pixel calculator 240, an evaluation function calculator 241, and a distance decision section 242.

The three-dimensional basic pixel calculator 240 determines a three-dimensional basic image from the output of the three-dimensional motion information extraction unit 202 and inter-image linear combination coefficient calculator 203. The evaluation function calculator 241 calculates a specific evaluation function Ei(Z) on the basis of the square error of the luminance synthesized from the determined basic image and linear combination coefficients and the actual luminance. The distance decision section 242 calculates the evaluation function Ei(Z) while changing the estimated distance Z and determines the distance Z which makes the evaluation function the smallest (ideally zero) to be the distance at that point.

The distance information detector 204 chooses a basic image from moving pictures and estimates the distance at each pixel in the portion corresponding to the face in the image according to the geometric luminance restraint with respect to another pixel (the linear restraint holds between the luminances at the geometrically corresponding points). In the process, the distance information detector 204 uses both of the result of the process at the three-dimensional motion information extraction unit 202 and the result of the process at the inter-image linear combination coefficient calculator 203.

Figure 17:
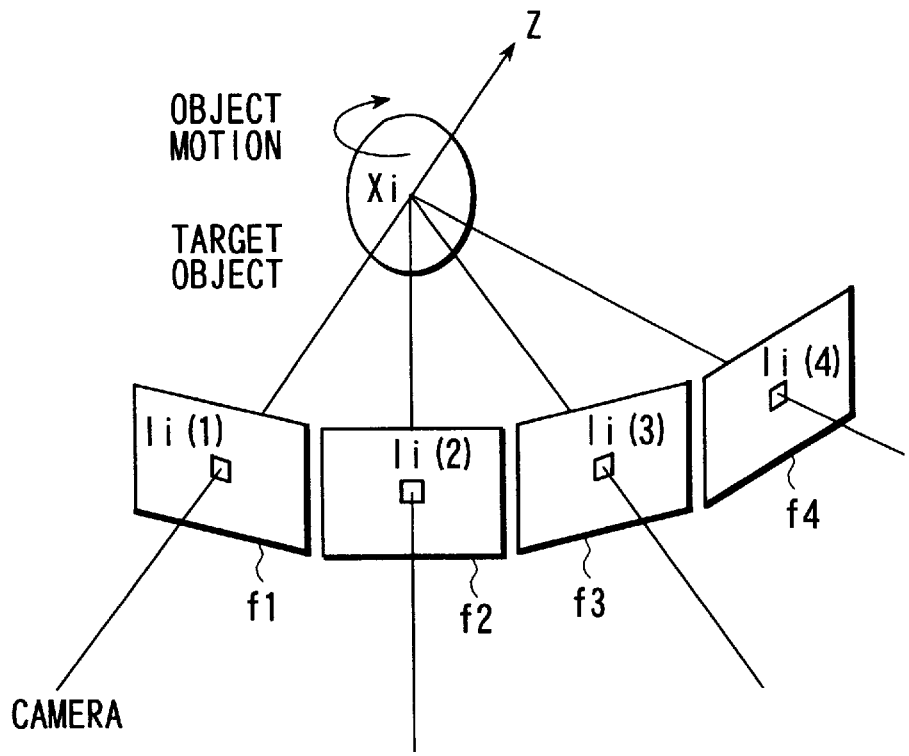
FIG. 17 is a drawing to help explain geometric brightness constraint condition used in the distance information detector of FIGS. 10 and 11 in the image processing apparatus of the second embodiment.

The process of the distance information detector is shown using four time-series images in FIG. 17. FIG. 17 is a pictorial view to help explain geometric luminance constraint used in the distance information detector 204 of FIGS. 10 and 11 in the image processing apparatus of the second embodiment. In FIG. 17, f1, f2, f3, and f4 each represent an image at a different point in time, Target Object is a subject to be shot, Object Motion is the direction of the movement of the subject, z indicates the optical axis of a camera, and Ii(1), Ii(2), Ii(3), and Ii(4) each represent the luminance of a pixel. Luminance Ii(1) of a given pixel of a reference image is represented by the linear combination of the luminance Ii(2), Ii(3), and Ii(4) at the geometrically corresponding points in the other three images. In the figure, the movement of the target object is considered to have the opposite phase to that of the camera.

Specifically, when luminance Ii(1) at a pixel on which a point Xi on the surface of the face in the first image has been projected is considered, the distance Z to the point Xi is estimated and luminance Ii(2), Ii(3), and Ii(4) are estimated when the same point Xi on an image at a different point in time is projected according to the estimated distance. Then, the degree that these luminances meet the linear combination restraint based on the linear combination coefficients calculated at the inter-image linear combination coefficient calculator 203 is evaluated. The evaluation enables the correct distance Z to be found through search.

Specifically, with the estimated distance Z, the three-dimensional basic pixel calculator 240 and evaluation function calculator 241 are constructed as follows.

In the three-dimensional basic pixel calculator 240, a basic pixel (three-dimensional vector) is determined to be $B_i^T(Z)$ and Ii(j)(j–1, . . . , 4) is expressed as Ii(jiZ) in integral form. Because the inter-image linear combination coefficient calculator 203 has already determined the linear combination coefficient s, the relation expressed by equation (25) holds:

$$Ii^T(Jiz) = \tilde{B}i^T(Z)\check{s} \tag{25}$$

Changing this gives equation (26):

$$\tilde{B}i^T(z) = Ii^T(jiz)\check{s}^T(\check{s}\check{s}^T)^{-1} \tag{26}$$

On the basis of equation (26), a three-dimensional basic pixel is obtained.

Next, in the evaluation function calculator 241, luminance $I_i^T(j;Z)$ synthesized by the three-dimensional basic pixel $B_i^T(Z)$ and linear combination coefficient s is expressed as:

$$\hat{I}_i^T(j;z) = \tilde{B}_i^T(z)\check{s} \tag{27}$$

The evaluation function calculator 241 calculates an evaluation function Ei(Z) expressed by equation (28) based on the square error of $I_i^T(j;Z)$ and the actual luminance $I_i^T(j;Z)$:

$$Ei(z) = \sum_{j=1}^{4} (Ii(j;z) - \hat{I}i(j;z))^2 \tag{28}$$

The distance decision section 242 calculates the evaluation function Ei(Z) while changing the estimated distance Z and determines the distance Z that makes the evaluation function the smallest (ideally zero) to be the distance at that point.

The distance image for the entire image is obtained by executing the above-described process for each point on the image.

The present invention is not limited to the second embodiment. For instance, when the continuity of the shape of the three-dimensional object can be estimated at the distance information detector 204, the errors in the detected shape can be alleviated by filtering.

When the distance decision section 242 estimates the distance Z, the three-dimensional motion information extraction unit 202 can limit the estimation range of the distance Z using three-dimensional position information S on the feature points extracted simultaneously with the motion of the object.

Furthermore, when in the inter-image linear combination coefficient calculator 203, the direction S of the light source is known as a liner coupling coefficient, equation (27) in the three-dimensional basic pixel calculator 240 is replaced with the following equation (29):

$$\check{\mathrm{I}}\mathrm{i}^T(j;\,Z)=\check{\mathrm{B}}\mathrm{i}^T(Z)s \qquad (29)$$

where $\mathrm{Bi}^T(Z)$ represents a normal vector whose size is equal to the intensity of shading on the surface of a physical object on the basis of the estimated distance Z.

When a normal vector $\check{\mathrm{B}}\mathrm{i}^T$ on the surface of an object has been obtained from the shadow of the image, $\check{\mathrm{I}}\mathrm{i}^T(j;Z)$ can be calculated directly by substituting $\check{\mathrm{B}}\mathrm{i}^T$ into equation (29).

On the basis of the description of the single point source, the present invention can be applied to an environment where a general light source is used as a combination of single point sources.

As described above, the present invention can be expanded in various ways by combining the geometric condition and optical condition of an object.

With the present invention, it is possible to provide an image processing apparatus and image processing method capable of reconstructing a moving object in a complex shape with a practical accuracy and processing speed. The apparatus and method both contribute greatly to the technique for creating images using three-dimensional CAD or three-dimensional CG (computer graphics).

As described above, with the present invention, the time-series images obtained by shooting a target object are used. The feature points contained in the image at a point in time of the time-series images are correlated with those at another point in time. From information on the positional coordinates of the correlated feature points, the three-dimensional position and posture of the target object at each point in time, that is, geometric coupling conditions for the time-series images, are determined. Furthermore, from information on the luminance of the correlated feature points, optical coupling conditions for the time-series images are computed. Using the geometric and optical coupling conditions for the time-series images, distance information at each pixel is obtained. The information is outputted as model information on the target object.

With such a system, a model (numerical data model) of a moving object in a complex shape, such as the head of a person, can be made automatically using a single camera as an input device.

A third embodiment of the present invention is related to an image processing apparatus and method which enable head tracking, and video compression that reduces the amount of information necessary for the transmission of images by extracting the motion vector of a person in a teleconference or at a videophone, and which also enable use of a three-dimensional pointer that effects pointing on VR (virtual reality) including video games.

The third embodiment intends that an image of an object is obtained in the form of moving pictures by use of a television camera, the moving pictures are analyzed for use in three-dimensional pointing, the tracking of the object (or the tracking of the motion), or the sensing or judging of the posture to do away with the trouble of wearing a device, such as gloves, and that a blink and the motion of the mouth during a teleconference or a talk over a videophone are generated by CG and the generated motions are added to a specific model to reduce the amount of information transmitted.

The way of acquiring information on the motion and position of the object from moving pictures, the way of acquiring the posture of the object, and the way of tracking will be explained below.

Figure 19:
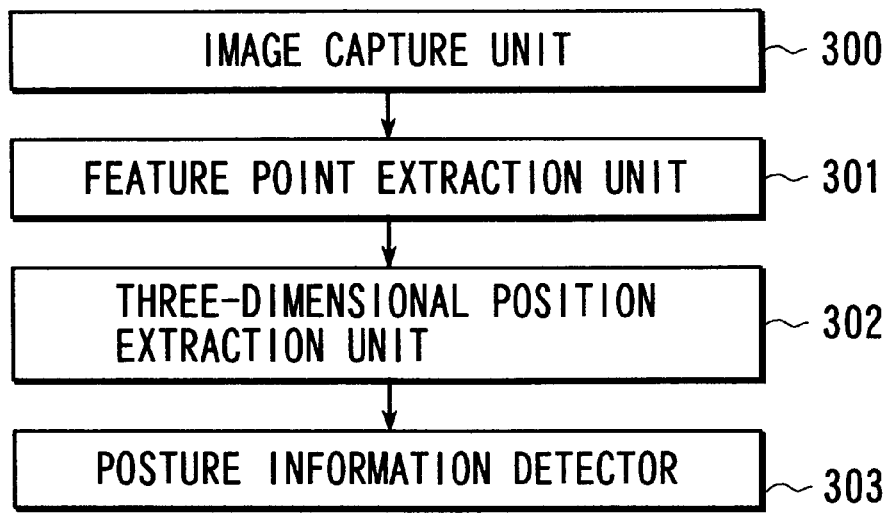
FIG. 19 is a block diagram of the overall configuration of an image processing apparatus according to a third embodiment of the present invention.

FIG. 19 shows a basic configuration of a moving picture processing apparatus according to the third embodiment of the present invention. In the Figure, the moving picture processing apparatus comprises an image capture unit 300, a feature point extraction unit 301, a three-dimensional position extraction unit 302, and a posture information detector 303.

The image capture unit 300 takes in images of an object in the form of moving pictures and supplies the moving picture data obtained by electrically capturing the object. The feature point extraction unit 301 extracts feature points constituting the surface of the object whose model is to be made from the moving picture data series obtained from the image capture unit 300. As show in FIG. 20, the feature point extraction unit 301 has the function of extracting isolated feature points and the function of extracting connected feature points.

Figure 20:
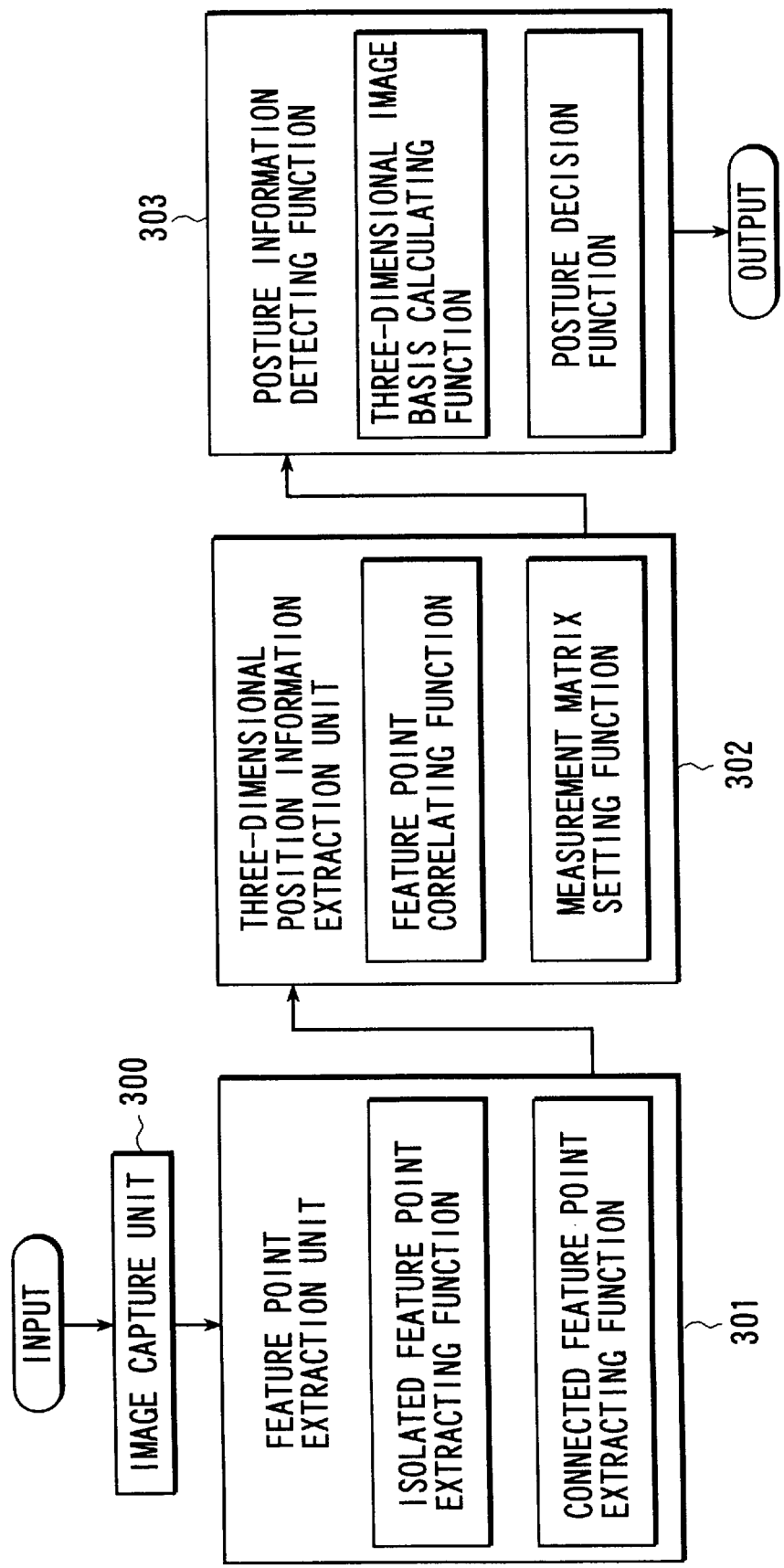
FIG. 20 is a block diagram of the overall configuration of an image processing apparatus according to the third embodiment of the present invention.

Using information on the extracted feature points, the three-dimensional position information extraction unit 302 finds three-dimensional position information on the individual feature points by correlating the feature points with each other between consecutive images and modifying a relation containing, as a coefficient matrix, the matrix generated from the positional coordinates of the group of the correlated feature points. As shown in FIG. 20, the three-dimensional position information extraction unit 302 has a feature point correlating function and the function of setting a measurement matrix.

On the basis of the feature points on which the three-dimensional position information has been obtained, the posture information detector 303 detects information on the motion of the object and effects tracking. As shown in FIG. 20, the posture information detector 303 has the function of calculating three-dimensional image basis and the function of determining the posture.

With the apparatus of the above configuration, the feature point extraction unit 301 extracts feature points constituting the surface of the object whose model is to be made from the moving picture series obtained from the image capture unit 300.

Next, the three-dimensional position information extraction unit 302 finds three-dimensional position information on the individual feature points by correlating the feature points with each other between the consecutive images and modifying a relation containing, as a coefficient matrix, the matrix generated from the positional coordinates of the group of the correlated feature points.

Finally, on the basis of the feature points on which the three-dimensional position information has been obtained, the posture information detector 303 detects information on the motion of the object and effects tracking.

As described above, to track the motion of the object automatically or acquire information on the position of the object or on the change of the posture, the feature point extraction unit 301, on the basis of the time-series images (the moving picture series), extracts feature points to make a model of the target object to be tracked. Then, the three-dimensional position information extraction unit 302 correlates the feature points with each other between the consecutive images and finds three-dimensional position information on the individual feature points from positional coordinate information on the feature point group. On the basis of the feature points on which the three-dimensional position information has been obtained, the posture information detector 303 tracks the motion of the object automatically according to the position of the feature points extracted at each frame of the time-series images and the luminance information.

Next, each component of the basic configuration will be explained.

Figure 21:
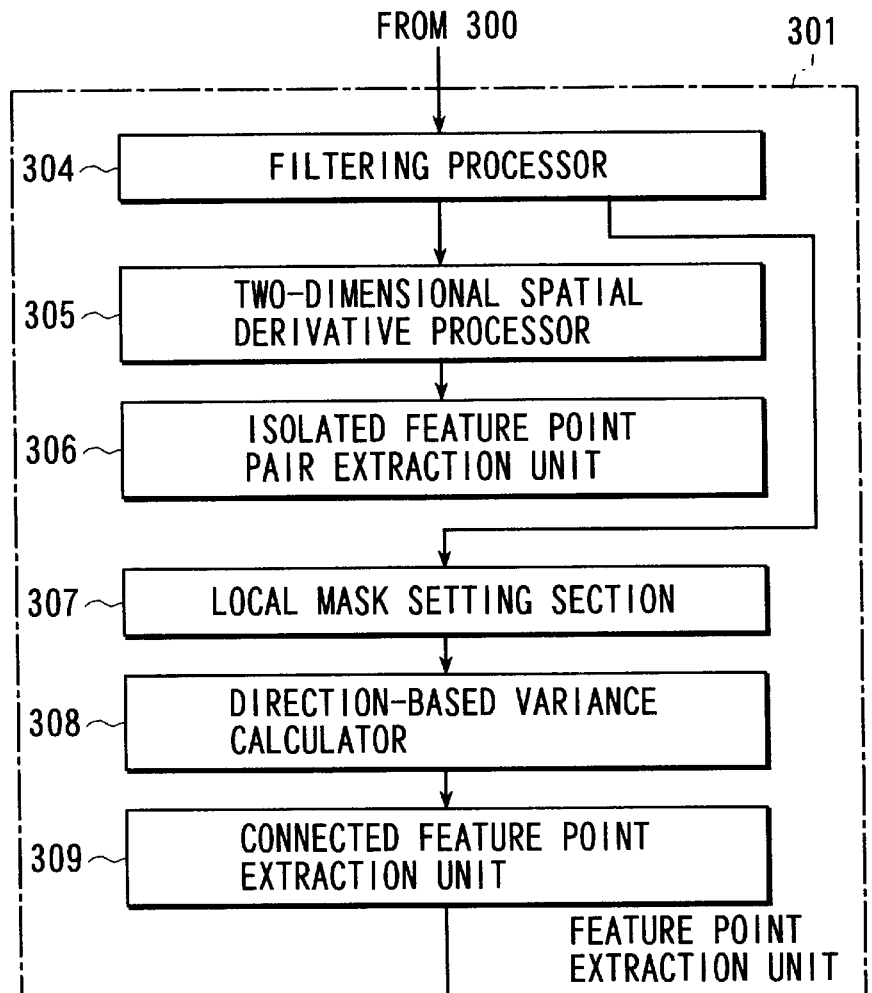
FIG. 21 is a detailed block diagram of the feature point extraction unit of FIG. 19 in the system of the third embodiment.

FIG. 21 shows a detailed configuration of the feature point extraction unit 301.

As shown in the figure, the feature point extraction 301 comprises a filtering processor 304, a two-dimensional spatial derivative processor 305, an isolated feature point pair extraction unit 306, a local mask setting section 307, a direction-based variance calculator 308, and a connected feature-point extraction unit 309.

The filtering processor 304 performs a filtering process on the original image from which feature points are to be extracted. It performs the filtering process on each of the images in the moving picture series inputted by the image capture unit 300. The two-dimensional spatial derivative processor 305 emphasizes the brightness of the isolated feature points by performing a two-dimensional spatial derivative process on the result of the filtering process at the filtering processor 304.

The isolated feature point pair extraction unit 306 extracts the isolated feature points by extracting the points larger than a specific threshold value from the result of emphasizing the brightness and stores the coordinates of the extracted isolated feature points (the coordinates on a screen for the original image) sequentially in a storage section (not shown).

The local mask setting section 307 sets local mask areas used to extract connected feature points, such as the outer corner of the eye or the ends of the lips in the head, for the images subjected to filtering the filtering processor 304. The direction-based variance calculator 308 computes the variance value by direction in each of the set local masks.

The connected feature point extraction unit 309 extracts, as a connected feature point, the central point of the local masks where the direction-based variance value obtained at the direction-based variance calculator 308 is larger than a specific threshold value in two or more directions. Then, the connected feature point extraction unit 309 stores the coordinates of the feature point in a storage section (not shown).

The operation of the feature point extraction unit 301 will be explained.

First, the filtering processor 304 performs a filtering process on the original image to be extracted. When the process is realized using a digital filter, a spatial filter of size 3 having the coefficient expressed by, for example, equation (1) can be used. The filtering process is carried out as pre-processing to reduce noise in the two-dimensional spatial derivative processor 304 and direction-based variance calculator 308. The two-dimensional spatial derivative processor 304 emphasizes the brightness of the isolated feature points by performing a two-dimensional spatial derivative process on the result of the filtering process. When the process is realized using a digital spatial filter, a spatial filter of size 3 having the coefficient expressed by, for example, equation (2) can be used.

Next, the isolated feature point extraction unit 306 extracts isolated feature points, such as a mole in the head, by extracting the points larger than a specific threshold value from the result of emphasizing the brightness and stores the coordinates of the feature points in sequence in a storage section (not shown).

Then, the local mask setting section 307 sets local mask areas used to extract connected feature points, such as the outer corner of the eye or the ends of the lips in the head, for the result of the filtering processor 304.

The connected feature points are found in the form of the portions where a plurality of contours (edges) intersect each other: for example, the outer corner of the eye is determined as the point where the upper contour of the eye intersects the lower contour, and the ends of the lips are determined as the points where the contour of the upper lip crosses the contour of the lower lip. The size of a local mask area is set beforehand so as to be optimum according to the length of the contours (edges) constituting the feature points to be extracted.

Next, the direction-based variance calculator 308 computes the variance value by direction in each of the set local masks. The direction includes, for example, four directions: a vertical direction, a horizontal direction, a direction at 45 degrees to the right, and a direction at 45 degrees to the left. The direction-based variance calculator 308 computes the variance value in each of the four directions using the brightness values of the consecutive pixels in each direction in the local mask.

Then, the connected feature point extraction unit 309 extracts, as a connected feature point, the central point of the local masks where the direction-based variance value obtained at the direction-based variance calculator 308 is larger than a specific threshold value in two or more directions. Then, the connected feature point extraction section 309 stores the coordinates of the feature point in a storage section (not shown).

To make an analysis of the position and posture of the object on the basis of a moving picture of the object and enable the user to do three-dimensional pointing sensuously and moreover to effect pointing or tracking without putting a device on the portion to be analyzed, the moving picture processing apparatus is constructed as follows.

The moving picture processing apparatus for tracking the target object in moving pictures, comprises a feature point extraction unit that extracts, at each point in time, feature points of the target object from the images of the target object obtained in time series, a three-dimensional position information extraction unit that finds three-dimensional position information on the individual feature points by correlating the feature points extracted at each point in time by the feature point extraction unit with each other between the time-series images and analyzing positional coordinate information on the correlated feature points, and an estimation unit which estimates at least one of the position and posture of the target object at each point in time in the time-series images.

With such a configuration, feature points of the target object are extracted at each point in time from the images of the target object obtained in time series. The feature points extracted at each point in time are correlated with each other between the time-series images. Three-dimensional position information on the feature points is found by analyzing position coordinate information on the correlated feature points. On the basis of the three-dimensional position information, at least one of the position and posture of the target object at each point in time in the time-series images is estimated.

As described above, tracking and the acquisition of information on the position and direction can be effected easily by extracting feature points of the target object from the time-series images of the target object and tracking the feature points over the images.

In the estimation unit, a processing section finds the posture of the target object as follows. The processing section generates a three-dimensional curved surface patch (directional patch) that passes the feature points on which the three-dimensional position information has been acquired and holds information on the brightness at the feature points and around them on the surface of the target object. Then, the processing section estimates the posture of the target object at each point in time in the time-series images by comparing the generated three-dimensional patch group with the images at each point in time of the time-series images on the basis of three-dimensional position information on the feature points that the three-dimensional patch group has passed.

In the estimation unit, a comparison section that compares the generated three-dimensional patch group with the images of the target object estimates the posture as follows. The comparison section generates synthesized images corresponding to various postures that the target object will possibly take, by expressing information on the brightness of the three-dimensional patch by the linear combination of image basis and finding a linear coefficient according to the posture of the target object. The comparison section then evaluates the various postures according to the similarity of the generated images to the image of the target object and estimates the posture on the basis of the evaluation.

In the present invention, when the target object in a series of moving pictures is tracked, the images obtained in time series by capturing the target object are taken in. The feature points of the target object are extracted from the images taken in at each point in time. Regarding the extracted feature points, the feature points contained in the image at each point in time in the time-series images are correlated with each other. By analyzing position coordinate information on the correlated feature points, three-dimensional position information on the feature points is found. On the basis of the found three-dimensional information, the position and posture of the target object at each point in time in the time-series images are estimated. Tracking and the acquisition of information on the position and direction are effected easily by extracting feature points of the target object from the time-series images obtained by electrically capturing the target object and tracking the feature points over the images. In the third embodiment explained below, an example of tracking the motion of the head of a person will be described using FIGS. 19 to 24.

Figure 22:
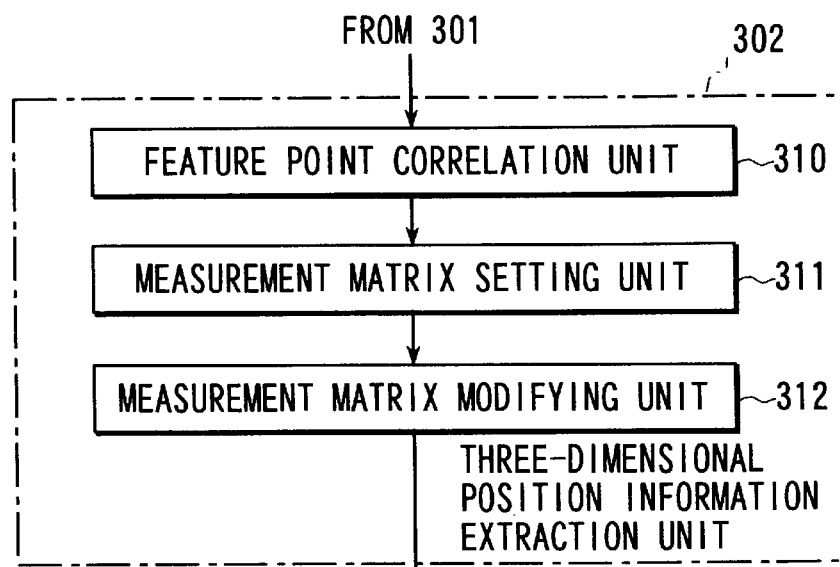
FIG. 22 is a detailed block diagram of the three-dimensional position extraction unit of FIG. 19 in the system of the third embodiment.

FIG. 22 shows a detailed configuration of the three-dimensional position information extraction unit 302.

As shown in FIG. 22, the three-dimensional position information extraction unit 302 comprises a feature point correlation unit 310, a measurement matrix setting unit 311, and a measurement matrix modifying unit 312. The feature point correlation unit 310 correlates the isolated feature point groups extracted at the feature point extraction unit 301 and the connected feature point groups with each other between the consecutive time-series images. The measurement matrix setting unit 311 creates a matrix from the positional coordinates of the correlated feature points. The measurement matrix modifying unit 312 finds three-dimensional position information on the individual feature points by modifying a relation containing the generated matrix as a coefficient matrix.

In the three-dimensional position information extraction unit 302, the feature point correlation unit 310 correlates the isolated feature point groups and the connected feature point groups with each other between the consecutive time-series images, using information on the feature points found and stored in a storage section (not shown) by the feature point extraction unit 310.

Figure 23:
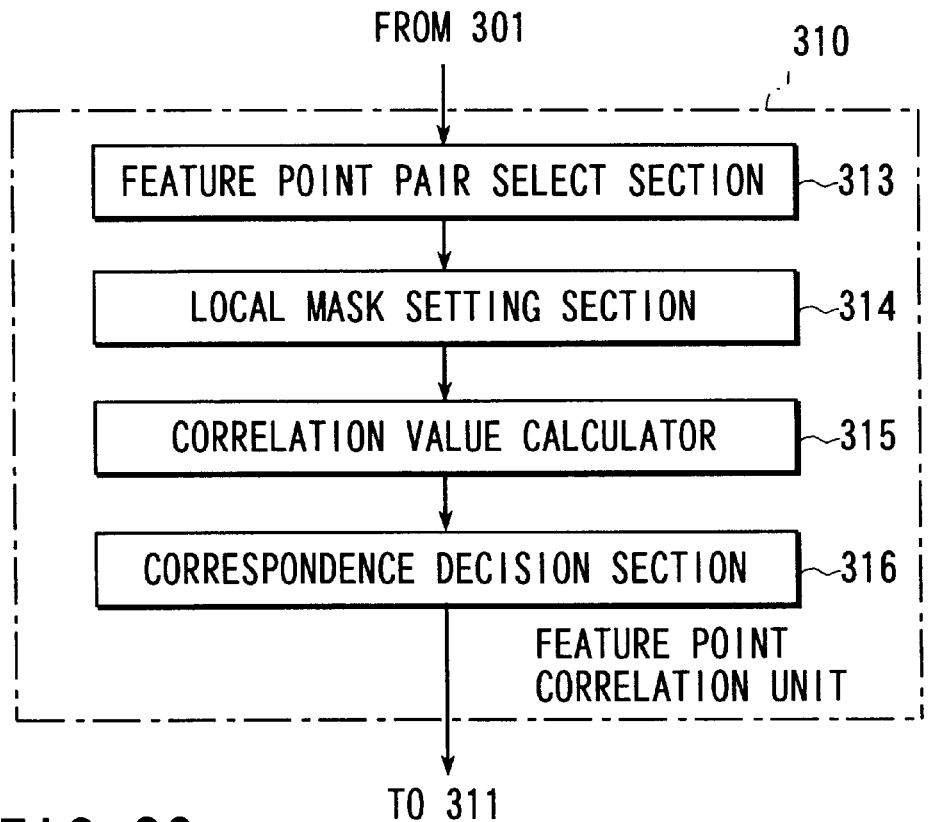
FIG. 23 is a detailed block diagram of the feature point correlation unit of FIG. 22 in the system of the third embodiment.

FIG. 23 shows a detailed configuration of the feature point correlation unit 310. As shown in FIG. 23, the feature point correlation unit 310 comprises a feature point pair select section 313, a local mask setting section 314, a correlation coefficient calculator 315, and a correlation decision section 316.

The feature point pair select section 313 selects a set of feature points to be correlated between consecutive time-series images. The local mask setting section 314 sets a local mask area containing the feature points in each of the images. The correlation coefficient calculator 315 calculates a correlation coefficient between the local mask areas. The correlation decision section 316 performs the process of determining a set of feature points whose correlation coefficient is larger than a specific threshold value and the largest to be the one already correlated and stores the set in a storage section (not shown). The correlation decision section 316 carries out the process for each of the extracted feature points.

In the feature point correlation unit 310, the feature point pair select section 313 selects a set of feature points to be correlated between the consecutive time-series images. Then, the local mask setting section 314 sets a local mask area containing the feature points in each of the images.

Next, the correlation coefficient calculator 315 calculates a correlation coefficient between the local mask areas. Then, the correlation decision section 316 performs the process of determining a set of feature points whose correlation coefficient is larger than a specific threshold value and the largest to be the one already correlated and stores the set in the storage section. The correlation decision section 316 carries out the process for each of the extracted feature points.

Next, the measurement matrix setting unit 311 creates a measurement matrix for finding a three-dimensional position using the coordinates of the correlated feature points.

In the embodiment, explanation will be given of an example of applying a factorization method to a case where the target object whose model is to be made is sufficiently far away from a camera (a device for producing video, such as a television camera), that is, a case where the target object meets the orthogonal projection condition.

In the set of the correlated feature points, it is assumed that the position of the p-th feature point in the f-th image is at (Xfp, Yfp). It is also assumed that the sum total of images is F and the number of sets of feature points is P.

If the position of the center of gravity of the p-th feature point group in the f-th image is at (Af, Bf), Af and Bf will be expressed by equation (3).

Finding the difference between these gives:

$$X'fp = Xfp - Af, \quad Y'fp = Yfp - Bf \tag{30}$$

Here, a measurement matrix W is expressed by equation (5). The measurement matrix W is a 2F×P matrix. Next, the measurement matrix modifying unit 312 modifies the measurement matrix W to resolve W into the product of two matrices and W=MS in equation (6). In this case, M represented by equation (14) is a 2F×3 matrix and S represented by equation (15) is a 3×P matrix. The resolution is realized using a singular value decomposition process.

Of the elements of matrix M, (xf, yf) is a fundamental vector for the f-th image and gives the central position of the image at each point in time in the moving picture series. The difference between the central point at one time and that at another time produces the motion of images.

Element Sp in S is the three-dimensional position (Xp, Yp, Zp) of the correlated p-th feature point.

Figure 24:
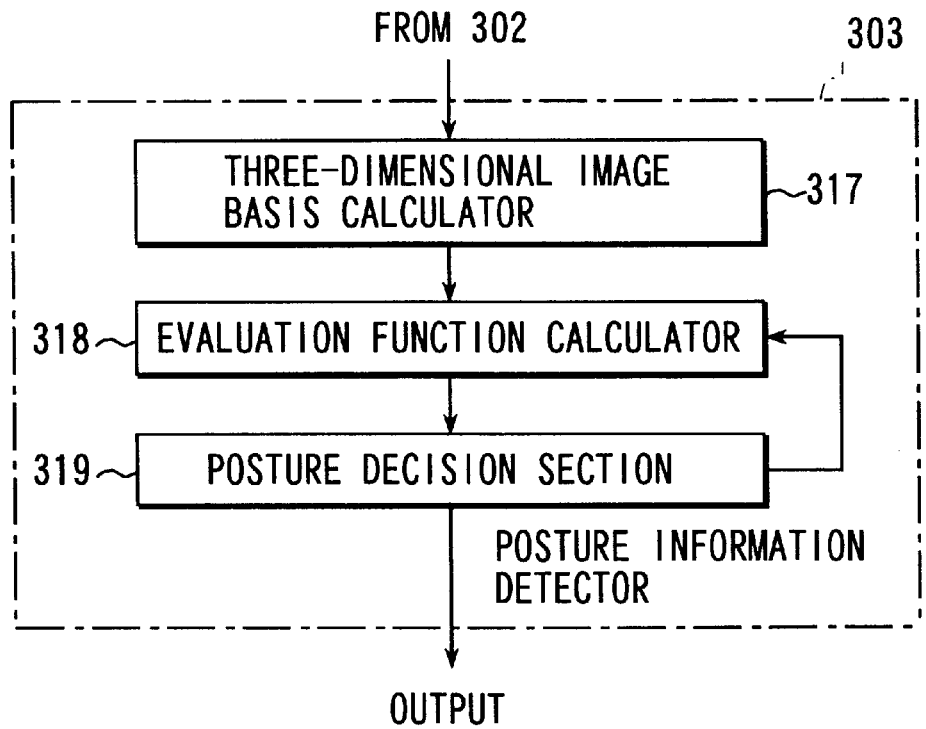
FIG. 24 is a detailed block diagram of the posture information detector of FIG. 19 in the system of the third embodiment.

FIG. 24 shows a detailed configuration of the motion information detector 303. The motion information detector 303 comprises a three-dimensional basic image calculator 317, an evaluation function calculator 318, and a posture decision section 319. The three-dimensional basic image calculator 317 finds a matrix representing a three-dimensional basic image and combines the three-dimensional basic image with a suitable linear coefficient to produce the luminance of the feature points of the target object for a given posture. Using the value obtained at the three-dimensional basic image calculator 317, the evaluation function calculator 318 detects information on the motion of the object whose posture is to be sensed. From the motion information, the evaluation function calculator 318 determines the probability that the posture in the present frame will take a certain posture. The posture decision section 319 determines the posture for which the probability is the highest.

Receiving three-dimensional position information on the individual feature points obtained at the three-dimensional position information extraction unit 302, the motion information detector 303 causes the three-dimensional basic image calculator 317 to synthesize the luminance of the feature points of the target object for a given posture.

This is done as follows. For instance, when points on the surface of the object are projected on points on the moving picture series, if the reflection by an infinitely distant point source n is expressed by a Lambertian model, the luminance of the i-th point in the j-th image will be expressed by equation (16), where Bi is obtained by multiplying the inner three-dimensional unit normal vector on the surface of the object by the surface reflectivity, R(j) is a matrix representing the rotation of the object covering the first image to the j-th image, and $s^k$ is obtained by multiplying a unit vector representing the direction of the k-th ray of light by the intensity of the light source. In the case of coarse patches, equation (16) can be expressed as equation (17). In this case, s' (j) is expressed as equation (18).

Dk(j) takes a value of 1 or 0, depending on whether the k-th light source illuminates the j-th image. (The patch indicates the smallest unit of a plane passing the feature points.)

When the number of feature points in the image is ni and an nj number of moving pictures are analyzed, luminance I can be expressed by a matrix determined by the equation (19). Where I is an ni×nj matrix containing elements Ii(j), B is an ni×3 matrix, each row expressed by $Bi^T$, and s is a 3×nj matrix, each column expressed by s' (j).

The feature point correlation section 310 performs the correlation process on the individual feature points in all of an nj number of moving pictures in the moving picture series. The luminance Ii(j) of the correlated feature points can be recorded in terms of luminance I.

By subjecting equation (19) to, for example, singular value resolution, an approximate expression of a matrix of rank 3 determined by equation (20) can be obtained. Where, B consists of $I_1$, $I_2$, and $I_3$ representing three-dimensional image basis as indicated by equation (21), and s in equation (22) is a 3×nj matrix containing linear combination coefficients. Combining the three-dimensional basic image with a suitable linear coefficient enables the luminance of the feature points of the target object to be synthesized for a given posture. The values obtained can be used to calculate the evaluation value in sensing the posture of the object in each frame in the time-series images.

Next, using the values, the evaluation function calculator 318 actually detects information on the motion of the head of a person.

It is assumed that the posture of the head with respect to an input image I is P. In the following process, P will be determined.

For each frame, the feature point extraction unit 301 extracts feature points. The posture P is estimated by matching the feature point groups with the feature point model for which the three-dimensional position information extraction unit 302 finds three-dimensional information. The probability that the posture will become P is expressed by expression (31):

$$P(P|m) \, P(P) \times P(m|P) \qquad (31)$$

where P(P) is the probability that the posture in the present frame will be P on the basis of the history of the posture in the past frame, and P(m|P) is the probability that the image's measurement index m will correspond to the assumed posture P.

Therefore, P(m|P) is the probability that the head will take posture P when the index is m. After the probability P(m|P) has been determined, the posture decision section 319 determines the posture P for which the probability P(m|P) becomes the highest to be the posture P of the head in the input image I.

The way of calculating P(P) and P(P|m) will be given below:

$$P(P) \propto \exp\left(-\frac{\|v\|^2}{2\sigma_v^2} - \frac{\|w\|^2}{2\sigma_w^2}\right) \qquad (32)$$

$$P(P|m) = \prod_{l=1}^{n_1} P(I_l|P) \qquad (33)$$

In equation (32), v is a linear speed, w an angular speed, δ v a standard value assumable for v, and δ w a standard value assumable for w. These can be estimated by, for example, calculating the average of the linear speeds and that of the angular speeds in all of the frames in a period up to time t.

To determine δ v and δ w, the difference between the linear speed and angular speed in the frame before the preceding frame and those in the preceding frame may be used instead of the above method.

From equation (32), P(P) is determined by calculating the square error of the estimated posture P of the head and the posture in the preceding frame. When the square error is the smallest, P(P) has the highest possibility.

In equation (33), $I_1$ is the luminance of the first feature point in a group of $n_1$ feature points generated in the input image. Because the luminance in the feature point group model for which three-dimensional information has been found can be synthesized using the three-dimensional basic image of equation (21) on the assumption the posture of the head is P, an evaluation function $P(I_1|P)$ with respect to posture P is calculated on the basis of the degree of the matching of $I_1$ with the luminance synthesized at the corresponding feature point.

Specifically, from the relationship between B (referred to as B1) corresponding to the first feature point, $I_1$, and equation (20), a linear combination coefficient $s_1$ is calculated using equation (34):

$$s_1 = (B_1^T B_1)^{-1} B_1^T I_1 \qquad (34)$$

The smaller the least square error ε of the luminance expressed by equation (35) using the above coefficient and the actual luminance $I_1$, the better the matching of them. According to the $\epsilon$, the probability $P(I_1|P)$ that luminance $I_1$ will correspond to posture P is evaluated. The evaluation function is calculated for all of the feature points and the results are multiplied as shown in equation (33) to give the probability P(m|P).

$$I'_1 = B_1 s_1 \qquad (35)$$

By performing the above process on each frame, the tracking of the head can be done through the transition of the posture judged by the posture decision section 319.

The present invention is not limited to what has explained in the above embodiment. For instance, the tracking of the object can be done by creating a three-dimensional patch (a curved-surface patch or a directional patch) beforehand around the feature point in the image instead of using the luminance of the feature point as $I_1$ in equation (33) and determining the posture of the object on the basis of the matching of the luminance of the patch and the luminance of the patch in the image in the present frame or both of the feature points and patch. As many patches as and as large patches as they enable the estimation of the posture are sufficient for tracking. The patches need not be so dense as they reconstruct the model of the head. The present invention is not limited to the head of a person and may be applied to an ordinary object from which a feature point can be extracted.

As described above, with the first embodiment, the time-series images obtained by electrically capturing a target object are used. The feature points contained in the image at each point in time in the time-series images are correlated with each other. Three-dimensional position information is found from position coordinate information on the correlated feature points. On the basis of the three-dimensional position information on the feature points, a three-dimensional patch group is formed. The patch group is outputted as information on a model of the target object. As a result, a surface model of a moving object in a complex shape, such as the head of a person, can be made automatically with a practical accuracy and processing speed. Therefore, highly accurate image processing can be realized by applying the present invention to, for example, three-dimensional CG.

With the second embodiment, it is possible to provide an image processing apparatus and image processing method capable of reconstructing a moving object in a complex shape with a practical accuracy and processing speed. The apparatus and method both contribute greatly to the technique for creating images using three-dimensional CAD or three-dimensional CG (computer graphics).

With the image processing method and apparatus of the third embodiment, when the target object in a series of moving pictures is tracked, the images obtained in time series by shooting the target object are taken in. The feature points of the target object are extracted from the images taken in at each point in time. Regarding the extracted feature points, the feature points contained in the image at each point in time in the time-series images are correlated with each other. By analyzing position coordinate information on the correlated feature points, three-dimensional position information on the feature points is found. On the basis of the found three-dimensional information, the position and posture of the target object at each point in time in the time-series images are estimated.

This enables tracking and the acquisition of information on the position and direction to be effected easily by extracting feature points of the target object from the time-series images obtained by electrically capturing the target object and tracking the feature points. Therefore, it is possible to provide an image processing apparatus and method which enable not only the tracking of a moving object in a complex shape with a practical accuracy and processing speed but also the sensing of the mouth, a blink, the motion of the head, and the posture used instead of CG for transmitting information on a teleconference or over a videophone, and which provide a three-dimensional pointer that helps reduce the amount of information on a teleconference or over a videophone.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. An image processing apparatus for acquiring a shape of a target object contained in a series of moving pictures, comprising:

an image capture unit configured to take in time-series images obtained in time series by shooting a target object;

a feature point extraction unit configured to extract feature points of said target object from said time-series images taken in by said image capture unit;

a motion information extraction unit configured to determine a change of a position and posture of said target object in each point of time in said time-series images by correlating feature points contained in the image at a point of time with those at another point of time in said time-series images extracted by said feature point extraction unit to obtain correlated feature points, and configured to analyze positional coordinate information on the correlated feature points;

an inter-image linear combination coefficient calculating unit configured to calculate a linear combination coefficient of image luminance between said time-series images by analyzing information on luminance at the feature points correlated by said motion information extraction unit and luminance around the correlated feature points; and a distance information detecting unit configured to estimate information on a distance to each point of said target from the position and posture of said target object determined by said motion information extraction unit at each point of time in said time-series images and the linear combination coefficient of image luminance between said time-series images, the linear combination coefficient being calculated by said inter-image linear combination coefficient calculating unit.

2. An image processing apparatus according to claim 1, wherein said distance information detecting unit includes:

a section configured to choose as a reference image an image at a specific time A from said time-series images, configured to set a distance Z of each pixel of the reference image to said target object, and configured to determine pixels corresponding to said each pixel in images at three or more points of time different from said specific time A from said distance Z and the position and posture of said target object determined by said motion information extraction unit at each point of time;

a matching degree calculating section configured to calculate a degree of matching of the luminance at the corresponding pixels with luminance at the pixel in said reference image using the linear combination coefficient calculated by said inter-image linear combination coefficient calculating unit; and a section configured to evaluate the distance Z estimated under a geometric condition and an optical condition according to the degree of matching found by said matching degree calculating section and configured to estimate the distance information on the basis of the evaluation.

3. An image processing method for acquiring a shape of a target object contained in a series of moving pictures, comprising the steps of:

taking in images obtained in time-series by shooting a target object;

extracting feature points of said target object from said time-series images taken in at the image taking-in step;

determining a change of position and posture of said target object in each point in time in said time-series images by correlating the feature points contained in the image at a point of time with those at another point of time in said time-series images extracted in said feature point extracting step to obtain correlated feature points and analyzing positional coordinate information on the correlated feature points;

calculating a linear combination coefficient of image luminance between said time-series images by analyzing information on luminance at the correlated feature points and luminance around the correlated feature points; and estimating information on a distance to each point of said determined target object from the position and posture of said target object at each point of time in said time-series images and the linear combination coefficient of image luminance between said calculated time-series images.

4. An image processing method according to claim 3, wherein said step of estimating distance information on said target object includes:

choosing as a reference image the image at a specific time A from said time-series images;

setting a distance Z of each pixel of the reference image to said target object in the reference image, evaluating the distance Z under a geometric condition and an optical condition; and determining pixels corresponding to the each pixel in the images at three or more points in time different from said specific time A from said distance Z and the position and posture at each point in time of said determined target object;

calculating a degree of matching of the luminance at the corresponding pixels with the luminance at the each pixel in said reference image using the linear combination coefficient between said calculated time-series images; and evaluating the distance Z estimated under a geometric condition and an optical condition according to the degree of matching and estimating the distance information on the basis of evaluation.

5. The image processing apparatus according to claim 1, wherein said inter-image linear combination coefficient calculating unit comprises:

a feature point correlation unit configured to correlate isolated feature points and connected feature points between the time-series images, the isolated feature points and the connected feature points being extracted by said feature point extraction unit;

an evaluation function calculator configured to calculate a specific evaluation function on the basis of a square error of the luminance synthesized from a basic image and the linear combination coefficient and the actual luminance; and a distance decision section configured to calculate an evaluation function while changing the distance and configured to determine a distance which makes the evaluation function the smallest to be the distance at that point.

6. The image processing apparatus according to claim 1, wherein said inter-image linear combination coefficient calculating unit includes a section configured to determine a linear combination coefficient between images by modifying a relation including as a coefficient matrix, a matrix generated from information on the luminance of each of the correlated feature points.

7. The image processing apparatus according to claim 1, wherein said feature point extraction unit comprises:

an isolated feature point extracting section configured to extract isolated feature points;

a connected feature point extracting section configured to extract connected feature points;

a filtering processor configured to perform a filtering process on time-series image data representing the time-series images;

a two-dimensional spatial derivative processor configured to emphasize brightness of the isolated feature points by performing a two-dimensional spatial derivative process on the time-series image data filtered by said filtering processor; and an isolated feature point pair extraction section configured to extract the isolated feature points in the images by extracting the portions for which the result of emphasizing the brightness is larger than a suitably set threshold value.

8. The image processing apparatus according to claim 7, wherein said isolated feature point extracting section includes:

a local mask setting section configured to set a local mask area used to extract consecutive feature points to a filtering result obtained by said filtering processor; and a direction-based variance calculator configured to compute a variance value by direction in each of the local masks set by said local mask setting section and a variance value in each direction using brightness values of the consecutive pixels in each direction in the local masks to output the variance value in each direction to said connected feature point extracting section.

9. The image processing apparatus according to claim 8, wherein said connected feature point extracted section extracts, as a connected feature point, a central point of the local masks where the direction-based variance value obtained at the direction-based variance calculator is larger than a specific value in two or more directions.

10. The image processing apparatus according to claim 8, wherein said direction-based variance calculator computes the variance value in each of a vertical direction, a horizontal direction, a direction at 45 degrees to a right, and a direction at 45 degrees to a left, using brightness values of the consecutive pixels in each direction in the local masks.

11. The image processing apparatus according to claim 1, wherein said motion information extraction unit includes:

a feature point correction section configured to correlate isolated feature points and connected feature points extracted at the feature point extraction unit with each other between the consecutive time-series images.

12. The image processing apparatus according to claim 11, wherein said feature point correlation section includes:

a feature point pair select section configured to select a set of feature points to be correlated between the consecutive time-series images;

a local mask setting section configured to set a local mask area including feature points in each image;

a correlation coefficient calculator configured to find a correlation coefficient between the local mask areas;

a correspondence decision section configured to perform a process of determining a set of feature points whose correlation coefficient is larger than a specific threshold value and the largest to be the one already correlated with each other and configured to store the set in a storage section; and a correspondence decision section configured to perform the process of determining for each of the extracted feature points.

13. The image processing method according to claim 3, wherein said step of calculating a linear combination coefficient includes:

correlating isolated feature points and connected feature points between the time-series images, the isolated feature points and the connected feature points being extracted by said feature point extracting step;

calculating a specific evaluation function on the basis of a square error of the luminance synthesized from a basic image and the linear combination coefficient and actual luminance; and calculating an evaluation function while changing the distance and configured to determine a distance which makes the evaluation function the smallest to be the distance at that point.

14. The image processing method according to claim 3, wherein said step of calculating a linear combination coefficient includes:

determining a linear combination coefficient between image by modifying a relation including as a coefficient matrix a matrix generated from information on the luminance of each of the correlated feature points.

15. The image processing method according to claim 3, wherein said step of extracting feature points comprises:

extracting isolated feature points;

extracting connected feature points;

performing a filtering process on time-series image data representing the time-series images;

emphasizing brightness of the isolated feature points by performing a two-dimensional spatial derivative process on the time-series image data filtered by said filtering step; and extracting the isolated feature points in the images by extracting the portions for which the result of emphasizing the brightness is larger than a suitably set threshold value.

16. The image processing method according to claim 15, wherein said step of extracting isolated feature points includes:

setting a local mask area used to extract consecutive feature points to a filtering result obtained by said filtering step; and computing a variance value by direction in each of the local masks and a variance value in each direction using brightness values of the consecutive pixels in each direction in the local masks to output the variance value in each direction.

17. The image processing method according to claim 16, wherein said step of extracting connected feature points includes:

extracting, as a connected feature point, a central point of the local masks where the direction-based variance value obtained at the direction-based variance calculator is larger than a specific value in two or more directions.

18. The image processing method according to claim 16, wherein said step of computing a variance value includes:

computing the variance value in each of a vertical direction, a horizontal direction, a direction at 45 degrees to a right, and a direction at 45 degrees to a left, using brightness values of the consecutive pixels in each direction in the local masks.

19. The image processing method according to claim 3, wherein said step of determining the change of position and posture includes:

correlating the isolated feature points and the connected feature points extracted at the feature point extraction unit with each other between the consecutive time-series images.

20. The image processing method according to claim 19, wherein said step of correlating the isolated feature points and the connected feature points includes:

selecting a set of feature points to be correlated between the consecutive time-series images;

setting a local mask area including feature points in each image;

finding a correlation coefficient between the local mask areas;

performing a process of determining a set of feature points whose correlation coefficient is larger than a specific threshold value and the largest to be the one already correlated with each other and storing the set in a storage section; and performing the process of determining for each of the extracted feature points.

* * * * *